(12) United States Patent
Komazaki

(10) Patent No.: US 8,384,661 B2
(45) Date of Patent: Feb. 26, 2013

(54) PROGRAM, INFORMATION STORAGE MEDIUM, DETERMINATION DEVICE, AND DETERMINATION METHOD

(75) Inventor: Takeharu Komazaki, Kawasaki (JP)

(73) Assignee: NAMCO Bandai Games Inc., Tokyo (JP)

( * ) Notice: Subject to any disclaimer, the term of this patent is extended or adjusted under 35 U.S.C. 154(b) by 781 days.

(21) Appl. No.: 12/393,474

(22) Filed: Feb. 26, 2009

(65) Prior Publication Data

US 2009/0278796 A1    Nov. 12, 2009

(30) Foreign Application Priority Data

Mar. 4, 2008 (JP) .................................. 2008-053356
Mar. 4, 2008 (JP) .................................. 2008-053357

(51) Int. Cl.
*G09G 3/30* (2006.01)
(52) U.S. Cl. ........................................................ 345/156
(58) Field of Classification Search .................. None
See application file for complete search history.

(56) References Cited

U.S. PATENT DOCUMENTS

| | | | |
|---|---|---|---|
| 2004/0046736 A1 | 3/2004 | Pryor et al. | |
| 2007/0213127 A1* | 9/2007 | Sato | 463/36 |
| 2007/0243931 A1 | 10/2007 | Ohta et al. | |
| 2007/0259717 A1 | 11/2007 | Mattice et al. | |
| 2008/0300055 A1* | 12/2008 | Lutnick et al. | 463/39 |

FOREIGN PATENT DOCUMENTS

JP    A-2007-282787    11/2007

OTHER PUBLICATIONS

Sep. 28, 2012 Search Report issued in European Patent Application No. 09154296.9.

* cited by examiner

*Primary Examiner* — Joseph Haley
(74) *Attorney, Agent, or Firm* — Oliff & Berridge, Plc

(57) ABSTRACT

A determination device stores a plurality of pieces of reference data associated with a predetermined movement pattern of a controller, and determines whether or not output values that respectively have a given relationship with reference data have been output from an acceleration sensor in a predetermined order within an input reception period in which an input that moves the controller in the predetermined movement pattern is received. The determination device receives an input that moves the controller in the predetermined movement pattern and performs a game process when the determination device has determined that the output values that respectively have the given relationship with the reference data have been output from the acceleration sensor in the predetermined order within the input reception period.

13 Claims, 14 Drawing Sheets

ORDERS OF REFERENCE DATA

A→C→D→E→F→G→H

A→B→D→E→F→G→H

A→B→C→E→F→G→H

A→B→C→D→F→G→H

A→B→C→D→E→G→H

A→B→C→D→E→F→H

A→B→C→D→E→F→G

B→C→D→E→F→G→H

| | REFERENCE DATA (x, y, z) |
|---|---|
| A | (1.0, 0.0, 0.0) |
| B | (0.5, 0.5, 0.0) |
| C | (0.0, 1.0, 0.0) |
| D | (-0.5, 0.5, 0.0) |
| E | (-1.0, 0.0, 0.0) |
| F | (-0.5, -0.3, 0.0) |
| G | (0.0, -0.5, 0.0) |
| H | (0.5, -0.3, 0.0) |

FIG. 8

| ORDERS OF REFERENCE DATA |
|---|
| A→B→C→D→E→F→G→H |
| B→C→D→E→F→G→H→A |
| C→D→E→F→G→H→A→B |
| D→E→F→G→H→A→B→C |
| E→F→G→H→A→B→C→D |
| F→G→H→A→B→C→D→E |
| G→H→A→B→C→D→E→F |
| H→A→B→C→D→E→F→G |

FIG. 9

| ORDERS OF REFERENCE DATA |
|---|
| A→C→D→E→F→G→H |
| A→B→D→E→F→G→H |
| A→B→C→E→F→G→H |
| A→B→C→D→F→G→H |
| A→B→C→D→E→G→H |
| A→B→C→D→E→F→H |
| A→B→C→D→E→F→G |
| B→C→D→E→F→G→H |

|   | REFERENCE DATA(x, y, z) |
|---|---|
| A | (1.0, 0.0, 0.0) |
| B | (0.5, 0.5, 0.0) |
| C | (0.0, 1.0, 0.0) |
| D | (-0.5, 0.5, 0.0) |
| E | (-1.0, 0.0, 0.0) |
| F | (-0.5, -0.3, 0.0) |
| G | (0.0, -0.5, 0.0) |
| H | (0.5, -0.3, 0.0) |

| ORDERS OF REFERENCE DATA |
|---|
| A→B→C→D→E→F→G→H |
| B→C→D→E→F→G→H→A |
| C→D→E→F→G→H→A→B |
| D→E→F→G→H→A→B→C |
| E→F→G→H→A→B→C→D |
| F→G→H→A→B→C→D→E |
| G→H→A→B→C→D→E→F |
| H→A→B→C→D→E→F→G |

FIG. 18

| | REFERENCE DATA (x, y, z) |
|---|---|
| A' | (1.0, 0.0, 0.0) |
| B' | (0.5, 0.5, 0.0) |
| C' | (0.0, 1.0, 0.0) |
| D' | (-0.5, 0.5, 0.0) |
| E' | (-1.0, 0.0, 0.0) |
| F' | (-0.5, -0.5, 0.0) |
| G' | (0.0, -1.0, 0.0) |
| H' | (0.5, -0.5, 0.0) |

FIG. 19

| ORDERS OF REFERENCE DATA |
|---|
| A'→B'→C'→D'→E'→F'→G'→H' |
| B'→C'→D'→E'→F'→G'→H'→A' |
| C'→D'→E'→F'→G'→H'→A'→B' |
| D'→E'→F'→G'→H'→A'→B'→C' |
| E'→F'→G'→H'→A'→B'→C'→D' |
| F'→G'→H'→A'→B'→C'→D'→E' |
| G'→H'→A'→B'→C'→D'→E'→F' |
| H'→A'→B'→C'→D'→E'→F'→G' |

PROGRAM, INFORMATION STORAGE MEDIUM, DETERMINATION DEVICE, AND DETERMINATION METHOD

Japanese Patent Application No. 2008-53356, filed on Mar. 4, 2008, and Japanese Patent Application No. 2008-53357, filed on Mar. 4, 2008, are hereby incorporated by reference in their entirety.

BACKGROUND OF THE INVENTION

The present invention relates to a program, an information storage medium, a determination device, and a determination method.

A determination device (game system) that allows the player to perform an input operation using a remote-control controller that includes an acceleration sensor has been known (see JP-A-2007-282787, for example). The determination device calculates the movement pattern of the controller based on values output from the acceleration sensor, and performs a game process based on the calculated movement pattern of the controller. For example, JP-A-2007-282787 discloses causing an object to move wings up and down when the vertical movement of the controller has been calculated based on the values output from the acceleration sensor.

If whether or not the player has moved the controller in a predetermined movement pattern is determined based on whether or not all of the values output from the acceleration sensor when the player moves the controller are approximately equal to values indicated by determination data set in advance, it is difficult for the player to satisfy the determination conditions so that the determination rate may decrease.

When determining whether or not the player has moved the controller in a predetermined movement pattern, the values (acceleration vectors) output from the acceleration sensor when the player moves the controller vary when the movement start position varies. Therefore, it may be determined that the player has not moved the controller in a predetermined movement pattern even if the player has moved the controller in a correct movement pattern. For example, when the player draws a circular path using the controller, the values output from the acceleration sensor differ between the case where the player draws a circular path from the upper side and the case where the player draws a circular path from the lower side.

The movement start position and the movement finish position of the controller may be fixed in order to prevent such a situation. However, this limits the movement pattern of the controller that can be used for the game.

SUMMARY

According to a first aspect of the invention, there is provided a program that determines a movement pattern of a controller that includes a sensor for detecting a physical quantity that changes according to a moving direction of the controller, the program causing a computer to function as:

a storage section that stores a plurality of pieces of reference data that indicates the moving direction of the controller;

an acquisition section that sequentially acquires a plurality of pieces of detected data that indicates the moving direction of the controller obtained from a detection result of the sensor;

a first determination section that determines whether or not the plurality of pieces of reference data respectively have a given relationship with the plurality of pieces of detected data; and a second determination section that determines the movement pattern of the controller based on the order that the plurality of pieces of reference data have been determined to respectively have the given relationship with the plurality of pieces of detected data.

According to a second aspect of the invention, there is provided a computer-readable information storage medium storing the above-described program.

According to a third aspect of the invention, there is provided a determination device that determines a movement pattern of a controller that includes a sensor for detecting a physical quantity that changes according to a moving direction of the controller, the determination device comprising;

a storage section that stores a plurality of pieces of reference data that indicates the moving direction of the controller;

an acquisition section that sequentially acquires a plurality of pieces of detected data that indicates the moving direction of the controller obtained from a detection result of the sensor;

a first determination section that determines whether or not the plurality of pieces of reference data respectively have a given relationship with the plurality of pieces of detected data; and a second determination section that determines the movement pattern of the controller based on the order that the plurality of pieces of reference data have been determined to respectively have the given relationship with the plurality of pieces of detected data.

According to a fourth aspect of the invention, there is provided a method of determining a movement pattern of a controller that includes a sensor for detecting a physical quantity that changes according to a moving direction of the controller, the method comprising:

sequentially acquiring a plurality of pieces of detected data that indicates the moving direction of the controller obtained from a detection result of the sensor;

determining whether or not a plurality of pieces of reference data stored in a storage section and indicating the moving direction of the controller have a given relationship with the plurality of pieces of detected data; and determining the movement pattern of the controller based on the order that the plurality of pieces of reference data have been determined to respectively have the given relationship with the plurality of pieces of detected data.

BRIEF DESCRIPTION OF THE SEVERAL VIEWS OF THE DRAWING

FIG. 8 is a table showing examples of an order of the reference data in FIG. 5 having a given relationship with detected data.

FIG. 9 is a table showing examples of an order of the reference data in FIG. 5 having a given relationship with detected data.

FIG. 18 is a table showing an example of reference data to be used when determining whether or not a movement pattern indicated by an instruction mark 340 has been input.

FIG. 19 is a table showing orders of the reference data in FIG. 18 having a given relationship with detected data.

DETAILED DESCRIPTION OF THE EMBODIMENT

Figure 1:
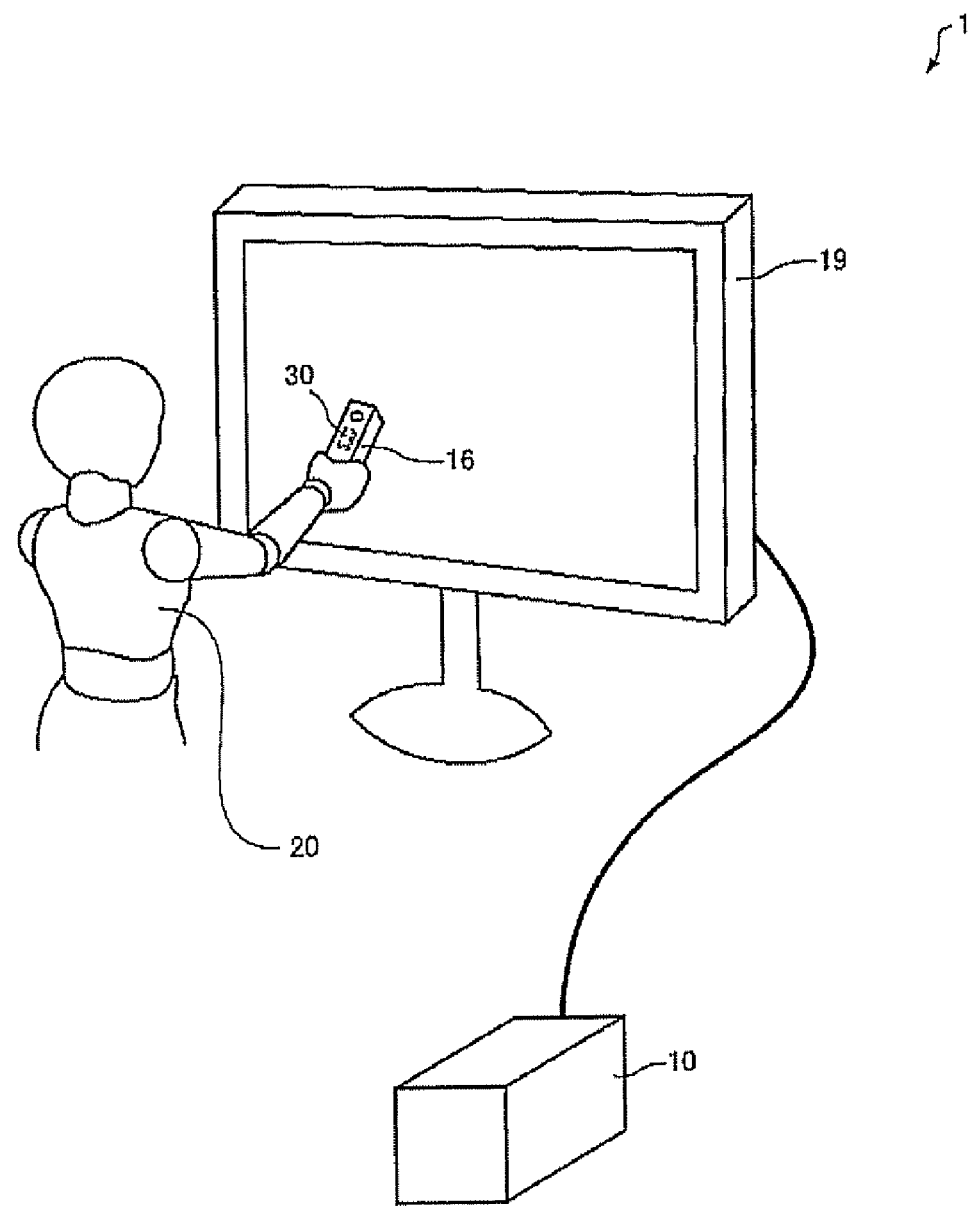
FIG. 1 is a schematic configuration diagram showing a determination device 1 according to a first embodiment of the invention.

The invention may provide a program, an information storage medium, a determination device, and a determination method that can appropriately determine the movement pattern of a controller without decreasing the determination rate when the player moves the controller in a predetermined movement pattern.

The invention may also provide a program, an information storage medium, a determination device, and a determination method that can appropriately determine the movement pattern of a controller irrespective of a movement start position of the controller.

(1) According to one embodiment of the invention, there is provided a determination device for a game that allows a player to perform an input operation using a controller, the controller including a sensor that detects a physical quantity that chances according to a movement, the determination device comprising:

a storage section that stores a plurality of pieces of reference data associated with a predetermined movement pattern of the controller;

a determination section that determines whether or not output values that respectively have a given relationship with the plurality of pieces of reference data have been output from the sensor in a predetermined order within an input reception period, an input that moves the controller in the predetermined movement pattern being received in the input reception period; and a game processing section that receives an input that moves the controller in the predetermined movement pattern and performs a game process when the determination section has determined that output values have been output from the sensor in the predetermined order within the input reception period.

According to one embodiment of the invention, there is provided a program causing a computer to function as the above-mentioned sections. According to one embodiment of the invention, there is provided a computer-readable information storage medium storing a program that causes a computer to function as the above-mentioned sections.

According to the above embodiments, whether or not an input that moves the controller in the predetermined movement pattern has been received is determined based on whether or not output values that respectively have the given relationship with the plurality of pieces of reference data have been output from the sensor in the predetermined order. Therefore, the movement pattern of the controller in the movement pattern can be appropriately determined without decreasing the determination rate.

(2) According to one embodiment of the invention, there is provided a determination device for a game that allows a player to perform an input operation using a controller, the controller including a sensor that detects a physical quantity that changes according to a movement, the determination device comprising:

a storage section that stores a plurality of pieces of reference data associated with a predetermined movement pattern of the controller;

a determination section that determines whether or not output values that respectively have a given relationship with the plurality of pieces of reference data have been output from the sensor in a predetermined order within an input reception period, an input that moves the controller in the predetermined movement pattern a predetermined number of times being received in the input reception period;

a counter section that counts a number of times that the determination section has determined that output values have been output from the sensor in the predetermined order until a count value reaches the predetermined number; and a game processing section that performs a game process based on the count value.

According to one embodiment of the invention, there is provided a program causing a computer to function as the above-mentioned sections. According to one embodiment of the invention, there is provided a computer-readable information storage medium storing a program that causes a computer to function as the above-mentioned sections.

According to the above embodiments, whether or not an input that moves the controller in the predetermined movement pattern the predetermined number of times has been received is determined based on the number of times that output values that respectively have the given relationship with the plurality of pieces of reference data have been output from the sensor in the predetermined order. Therefore, the movement pattern of the controller in the movement pattern can be appropriately determined without decreasing the determination rate.

(3) In each of the above-described determination device, program, and information storage medium, the game processing section may increase benefits to be obtained by the game process as the count value of the counter section increases.

According to this configuration, the more appropriately the player moves the controller in the predetermined movement pattern the predetermined number of times, the more the player is benefited, so a more interesting game can be implemented.

(4) In each of the above-described determination device, program, and information storage medium, the game processing section may receive an input that moves the controller in the predetermined movement pattern the predetermined number of times and performs the game process on condition that the count value has reached the predetermined number.

According to this configuration, the game processing section receives an input only when the player has moved the controller in the predetermined movement pattern the predetermined number of times.

(5) Each of the above-described determination device, program, and information storage medium may further comprise or may cause the computer to further function as:

a data production section that produces the plurality of pieces of reference data based on the output values output from the sensor when the player moves the controller in the predetermined movement pattern.

This makes it possible to produce the plurality of pieces of reference data appropriate for the player who moves the controller in the predetermined movement pattern.

(6) In each of the above-described determination device program, and information storage medium, the game processing section may cause a display section to display an instruction mark that instructs the player to move the controller in the movement pattern.

This makes it possible to notify the player of the timing at which the player should move the controller in the predetermined movement pattern.

(7) Each of the above-described determination device, program, and information storage medium may further comprise or may cause the computer to further function as:

a sound control section that controls reproduction of music; and the game processing section may cause the display section to display the instruction mark in synchronization with reproduction of the music, and cause the display section to display a character that performs a dance movement associated with the predetermined movement pattern of the controller.

(8) In each of the above-described determination device, program, and information storage medium, the physical quantity detected by the sensor may be an acceleration vector of the controller, and each of the plurality of pieces of reference data may indicate an acceleration vector in at least one axial direction.

(9) According to one embodiment of the invention, there is provided a determination device for a game that allows a player to perform an input operation using a controller, the controller including a sensor that detects a physical quantity that changes according to a movement, the determination device comprising:

a storage section that stores a plurality of pieces of reference data associated with a predetermined movement pattern of the controller;

a determination section that determines whether or not output values that respectively have a given relationship with the plurality of pieces of reference data have been output from the sensor in one of a plurality of predetermined orders within an input reception period, an input that moves the controller in the predetermined movement pattern being received in the input reception period; and a game processing section that receives an input that moves the controller in the predetermined movement pattern and performs a game process when the determination section has determined that output values have been output from the sensor in the predetermined order within the input reception period.

According to one embodiment of the invention, there is provided a program causing a computer to function as the above-mentioned sections. According to one embodiment of the invention, there is provided a computer-readable information storage medium storing a program that causes a computer to function as the above-mentioned sections.

According to the above embodiments, whether or not an input that moves the controller in the predetermined movement pattern has been received is determined based on whether or not output values that respectively have the given relationship with the plurality of pieces of reference data have been output from the sensor in one of the plurality of predetermined orders. Therefore, since an input is received irrespective of the movement start position of the controller when output values that have the given relationship with the plurality of pieces of reference data have been output from the sensor in one of the plurality of predetermined orders, the movement pattern of the controller can be determined irrespective of the movement start position of the controller.

(10) In each of the above-described determination device, program, and information storage medium, the predetermined movement pattern may be a circular moving path, and coordinates of the plurality of pieces of reference data may have four-fold rotational symmetry.

The term "rotational symmetry" means that a moving path (coordinates) coincides before and after rotation when rotating the moving path (coordinates) around an axis. The term "four-fold rotational symmetry" means that a moving path (coordinates) coincides four times when rotating the moving path (coordinates) around an axis in the range from 0° to 360°.

According to this configuration, the movement pattern of the controller can be appropriately determined irrespective of the inclination (direction) of the controller around the rotation axis when moving the controller along a circular moving path.

1. First Embodiment

A first embodiment of the invention will now be described below. Note that the embodiment described below does not unduly limit the scope of the invention as stated in the claims. Also, not all the elements described in this embodiment should be taken as essential requirements of the invention.

1-1. Configuration of Determination Device

FIG. 1 is a schematic configuration diagram showing an example of a determination device 1 according to this embodiment.

The determination device 1 includes a controller 16 that is held by a player 20 and can be arbitrarily changed in position, posture, and direction, a game device main body 10 that performs a game process, and a display 19 that displays a game image. In this embodiment, the controller 16 and the game device main body 10 exchange information via wireless communication. Note that the controller 16 and the game device main body 10 may be connected via a communication cable, and may exchange information via the communication cable.

The controller 16 includes an acceleration sensor 30. The acceleration sensor 30 detects the movement of the controller 16 as an acceleration vector (i.e., a physical quantity that changes corresponding to a movement). In this embodiment, a triaxial acceleration sensor that can detect triaxial acceleration vectors is used as the acceleration sensor 30. Note that an acceleration sensor that detects uniaxial or biaxial acceleration vectors may also be used.

The game device main body 10 performs the game process based on an output value (acceleration vector) output from the acceleration sensor 30. The game device main body 10 causes the display 19 to display various game images and causes a speaker (not shown) to output various yes of sound (e.g., background music (BGM)) during a game based on the processing resets.

In this embodiment, since the acceleration sensor 30 detects the movement of the controller 16, the movement of the controller 16 can be output as operation information. Therefore, the player 20 can enjoy a virtual reality game that allows the player 20 to move the controller 16 as if to actually make a movement in the game.

1-2. Functional Blocks of Determination Device

Figure 2:
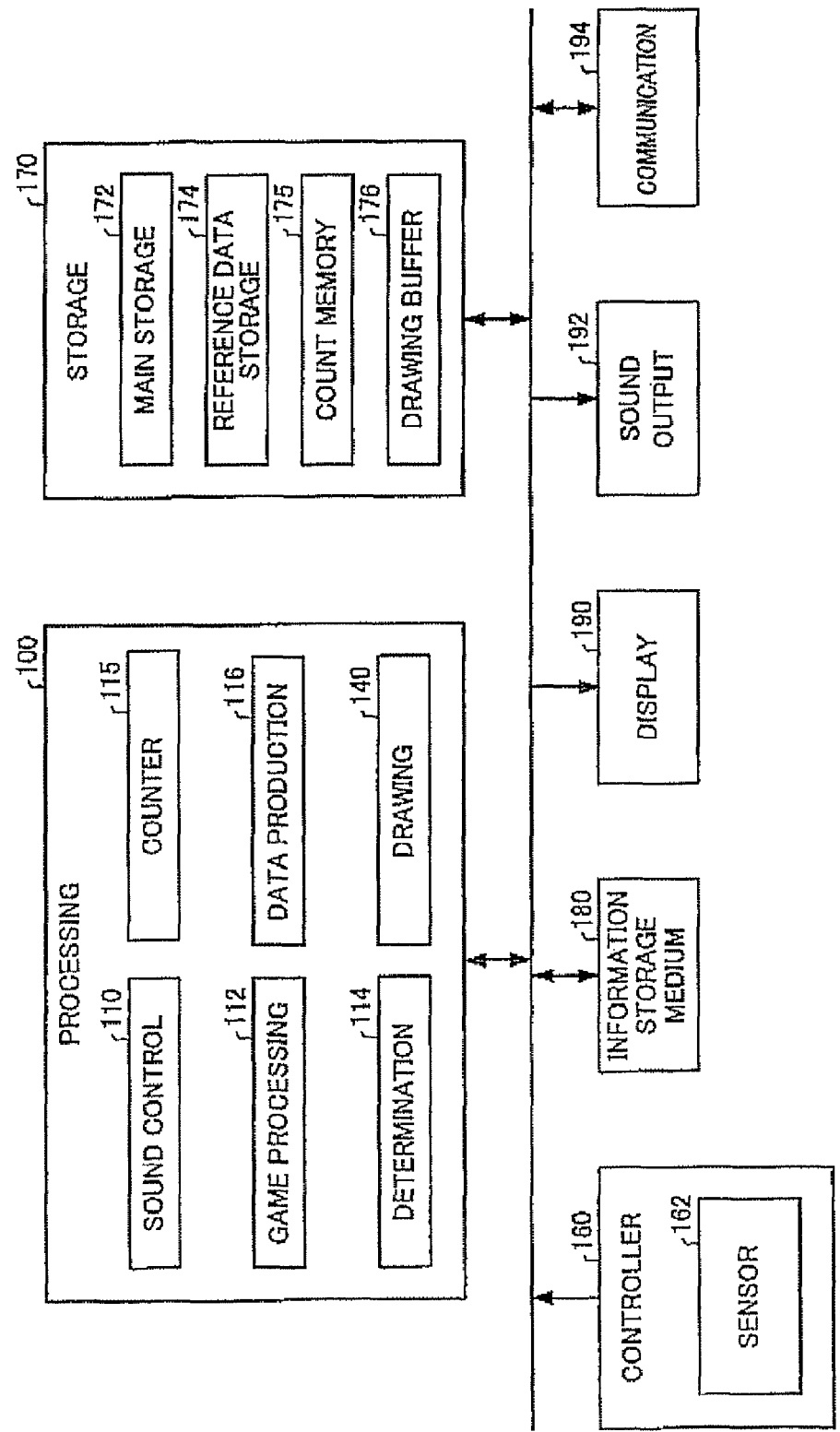
FIG. 2 is a functional block diagram showing an example of the determination device 1 according to the first embodiment.

FIG. 2 is a functional block diagram showing an example of the determination device 1 according to this embodiment. Note that the determination device 1 according to this embodiment need not necessarily include all of the elements (sections) shown in FIG. 2. The determination device 1 according to this embodiment may have a configuration in which some of the elements are omitted.

The controller 16 outputs an operation performed by the player as the operation information. The controller 16 according to this embodiment includes a sensor 162 that detects a physical quantity that changes corresponding to at least one of the movement, the position, the direction, and the like of the controller 16. The controller 16 outputs the physical quantity detected by the sensor 162 as the operation information.

The sensor 162 detects the amount of change in acceleration, angular velocity, speed, or the like that has occurred in a unit time as the physical quantity that changes corresponding to at least one of the movement, the position, the direction, and the like of the controller 16, and outputs the detected acceleration or the like. In this embodiment, the function of the sensor 162 is implemented by the acceleration sensor 30 (e.g., piezoelectric acceleration sensor, electrodynamic acceleration sensor, or strain gauge acceleration sensor). Note that the function of the sensor 162 may be implemented by a position/direction sensor, a gyrosensor, or the like. In this embodiment, the sensor 162 outputs an output value every five milliseconds.

The controller 16 may output the position on an indication surface (e.g., display section 190) indicated by the controller 16 as the operation information. In this case, an imaging element (light-receiving element) such as a CMOS sensor or a CCD is provided in the controller 16, a light source (e.g., LED) provided on the indication surface (near the indication surface) is imaged using the imaging element, and the position on the indication surface indicated by the controller 16 is calculated based on position information that indicates the imaged light source and imaging-side reference position information set in advance, for example, The controller 16 may further include a button, a lever, a microphone, a trackball, a touch panel, and the like. The player may move the controller 16 while holding or wearing the controller 16.

An information storage medium 180 (computer-readable medium) stores a program and data (i.e., a program and data that cause a computer to function as each section according to this embodiment). The function of the information storage medium 180 may be implemented by hardware such as an optical disk (e.g., CD or DVD), a magneto-optical disk (MO), a magnetic disk, a hard disk, a magnetic tape, or a memory (ROM).

A storage section 170 serves as a work area for a processing section 100, a communication section 194, and the like, and stores a program and data loaded from the information storage medium 180. The function of the storage section 170 may be implemented by hardware such as a RAM (VRAM). The storage section 170 includes a main storage section 172, a reference data storage section 174, a count memory 175, and a drawing buffer 176. The reference data storage section 174 stores a plurality of pieces of reference data associated with a predetermined movement pattern of the controller 16. A counter section 115 (described later) counts the number of times of outputs determined by a determination section 114 (described later) and stores the number in the count memory 175.

The display section 190 (display 19) outputs an image generated by the processing section 100. The function of the display section 190 may be implemented by hardware such as a CRT display, a liquid crystal display (LCD), an organic EL display (OELD), a plasma display panel (PDP), a touch panel display, or a head mount display (HMD).

A sound output section 192 outputs sound generated by the processing section 100. The function of the sound output section 192 may be implemented by a speaker, a headphone, or the like.

A communication section 194 communicates with the outside (e.g., server or another determination device 1) through a network. The function of the communication section 194 may be implemented by hardware such as a processor or a communication ASIC, a program, or the like.

A program and data that cause a computer to function as each section according to this embodiment may be distributed to the information storage medium 180 (storage section 170) from an information storage medium included in a server through a network and the communication section 194. Use of the information storage medium included in the server is also included within the scope of the invention.

The processing section 100 (processor) performs various processes (e.g., game process, image generation process, and sound generation process) based on the operation information from the controller 16, the program and data loaded into the storage section 170 from the information storage medium 180, and the like using the main storage section 172 of the storage section 170 as a work area. For example, the processing section 100 starts the game when game start conditions have been satisfied, proceeds with the game, disposes an object such as a character or a map, displays an object, calculates game results, and finishes the game when game end conditions have been satisfied. The function of the processing section 100 may be implemented by hardware such as a processor (e.g., CPU or DSP) or ASIC (e.g., gate array) and a program.

The processing section 100 includes a sound control section 110, a game processing section 112, the determination section 114, the counter section 115, a data production section 116, and a drawing section 140. Note that the processing section 100 may have a configuration in which some of these sections are omitted.

The sound control section 110 performs a sound process based on the results of various processes performed by the processing section 100 to generate game sound (e.g., music, BGM, or effect sound), and cause the sound output section 192 to output the game sound. Specifically, the sound control section 110 controls reproduction of game sound (e.g., music, BGM, or effect sound) based on sound data written into the main storage section 172 from the information storage medium 180. For example, when the game is a musical performance game, the sound control section 110 controls reproduction of music corresponding to each game stage when the game has started.

The game processing section 112 controls display of an image (object image) displayed on the display section 190. Specifically, the game processing section 112 generates a display target object such as an instruction mark (i.e., an instruction mark that instructs the player 20 to move the controller 16 in a predetermined movement pattern), a character, a moving object (e.g., car or airplane), a building, a tree, a pillar, a wall, or a map (topography), instructs object display and a display position, or causes an object to disappear, for example. Specifically the game processing section 112 registers the generated object in an object list, transfers the object list to the drawing section 140 or the like, or deletes an object that has disappeared from the object list, for example. For example, when the game is a musical performance game, the game processing section 112 causes the display section 190 to display an instruction mark that instructs the player 20 to move the controller 16 in a predetermined movement pattern (moving path) and a character that dances corresponding to the predetermined movement pattern of the controller 16 in synchronization with reproduction of music.

When an object (i.e., a display object defined by two-dimensional data or three-dimensional data) has made a motion or moved, the game processing section 112 causes the display section 190 to display an image that indicates the movement or motion of the object. Specifically, the game processing section 112 causes the display object to move (make a motion) based on the operation information from the controller 16, a program (movement algorithm), data (motion data), and the like. More specifically, the game processing section 112 sequentially calculates movement information (position, rotational angle, speed, or acceleration) and motion information (position, rotational angle, or shape of each part) of the display object every frame (1/60th of a second). The term "frame" used herein refers to a time unit for the process that controls the movement and motion of the display object and the drawing process that generates an image.

The game processing section 112 receives an input that moves the controller 16 in a predetermined movement pattern when the determination section 114 (described later) has determined that output values that satisfy predetermined conditions have been output. For example, when the game is a musical performance game, the game processing section 112 updates a score parameter, or updates a parameter that controls the game process (i.e., a parameter that determines whether or not to continue the game or a parameter that determines whether or not the game has been cleared). The game processing section 112 also causes a character to perform a dance movement associated with a predetermined movement pattern of the controller 16, for example. For example, when the game is a fighting game that determines victory or defeat of a character based on a strength parameter of the character (i.e., a parameter that controls the game process), the game processing section 112 causes a player's character to make a special attack that can reduce the strength parameter of an opposing character to a large extent as compared with a normal attack. For example, when the game is a racing game that allows the player to move a moving object such as a car on a racecourse and compete for ranking or speed (time), the game processing section 112 increments a speed parameter of the moving object so that the moving object is accelerated rapidly. These game processes are merely given as examples. Other game processes may be appropriately employed. The parameter used in each game is stored in the storage section 170.

The game processing section 112 performs the game process based on the count value of the counter section 115 (described later). For example when the game is a musical performance game, the game processing section 112 updates a score parameter based on the count value of the counter section 115, or updates a parameter that controls the game process (i.e., a parameter that determines whether or not to continue the game or a parameter that determines whether or not the game has been cleared) based on the count value of the counter section 115. When the game is a fighting game, the game processing section 112 causes a player's character to make a special attack that can reduce a strength parameter of an opposing character based on the count value of the counter section 115. When the game is a racing game, the game processing section 112 increments a speed parameter of a moving object based on the count value of the counter section 115 so that the moving object is accelerated rapidly.

The game processing section 112 increases benefits obtained by the game process as the count value of the counter section 115 increases. For example, when the game is a musical performance game, the game processing section 112 increases a value added to a score parameter as the count value of the counter section 115 increases. When the game is a fighting game, the game processing section 112 increases a value subtracted from a strength parameter of an opposing character as the count value of the counter section 115 increases. When the game is a racing game, the game processing section 112 increases a value added to a speed parameter of a moving object as the count value of the counter section 115 increases.

The game processing section 112 may receive an input that moves the controller in a predetermined movement pattern a predetermined number of times on condition that the count value of the counter section 115 has reached a predetermined value. For example, when the game is a musical performance game, the game processing section 112 may update a score parameter or update a parameter that controls the game process (i.e., a parameter that determines whether or not to continue the game or a parameter that determines whether or not the game has been cleared) on condition that the count value of the counter section 115 has reached a predetermined value. The game processing section 112 may cause a character to perform a dance movement associated with a predetermined movement pattern of the controller 16 on condition that the count value of the counter section 115 has reached a predetermined value, for example. When the game is a fighting game, the game processing section 112 may cause a player's character to make a special attack that can reduce a strength parameter of an opposing character on condition that the count value of the counter section 115 has reached a predetermined value. When the game is a racing game, the game processing section 112 may increment a speed parameter of a moving object so that the moving object is accelerated rapidly on condition that the count value of the counter section 115 has reached a predetermined value.

The determination section 114 determines whether or not output values that respectively have a given relationship with values indicated by the reference data stored in the reference data storage section 174 have been output from the sensor 162 in a predetermined order within an input reception period in which an input that moves the controller 16 in a predetermined movement pattern is received. The determination section 114 determines whether or not output values that respectively have a given relationship with values indicated by the reference data stored in the reference data storage section 174 have been output from the sensor 162 in a predetermined order within an input reception period in which an input that moves the controller 16 in a predetermined movement pattern a predetermined number of times is received. The term "output values that respectively have a given relationship with the values indicated by the reference data" includes an output value larger than the value indicated by the reference data, an output value equal to or larger than the value indicated by the reference data, an output value equal to or smaller than the value indicated by the reference data, and an output value smaller than the value indicated by the reference data. For example, when the game is a musical performance game, the determination section 114 determines whether or not output values (i.e., an output value equal to or larger than the value indicated by the reference data when the value indicated by the reference data is positive, or an output value equal to or smaller than the value indicated by the reference data when the value indicated by the reference data is negative) that respectively have a given relationship with values indicated by the reference data stored in the reference data storage section 174 have been output from the sensor 162 in a predetermined order within a period (i.e., input reception period) in which an instruction mark that instructs the player 20 to move the controller 16 in a predetermined movement pattern is displayed. In is embodiment, since the determination section 114 performs the determination process every frame, the determination section 114 performs the determination process using a plurality of output values. The predetermined order may be set in a program, or order determination data may be stored in the storage section 170.

The counter section 115 counts the number of times of outputs determined by the determination section 114 within the input reception period. Specifically, the counter section 115 counts the number of times that the determination section 114 has determined that predetermined output values have been output in the count memory 175 until a predetermined value is reached, each time the determination section 114 has determined that predetermined output values have been output.

The data production section 116 produces a plurality of pieces of reference data to be stored in the reference data storage section 174 based on the output values output from the sensor 162 when the player moves the controller 16 in a predetermined movement pattern. For example, the player 20 moves the controller 16 in a predetermined movement pattern used in the game before the game starts, and the data production section 116 produces a plurality of pieces of reference data based on the output values output from the sensor 162 when the player moves the controller 16, and stores the produced reference data in the reference data storage section 174.

The drawing section 140 performs a drawing process based on the results of the game process and the like performed by the processing section 100 to generate an image, and outputs the generated image to the display section 190. The image generated by the drawing section 140 may be a two-dimensional image or a three-dimensional image.

When the drawing section 140 generates a two-dimensional image, the drawing section 140 creates drawing data by synthesizing objects so that an object with higher priority is displayed in front of an object with lower priority. The drawing section 140 draws the sythesized objects in the drawing buffer 176 (i.e., a buffer that can store image information in pixel units (e.g., frame buffer or intermediate buffer); VRAM) based on the drawing data to generate a two-dimensional image.

When the drawing section 140 generates a three-dimensional image, the drawing section 140 performs a geometric process such as coordinate transformation (world coordinate transformation or camera coordinate transformation), clipping, and perspective transformation, and creates drawing data (e.g., position coordinates of primitive vertices, texture coordinates, color data, normal vector, or alpha value) based on the processing results. The drawing section 140 draws an image of an object (one or more primitives) subjected to perspective transformation geometric process) in the drawing buffer 176 based on the drawing data (primitive data). The drawing section 140 thus generates an image viewed from a virtual camera (given viewpoint) in a game space.

The determination device 1 according to this embodiment may be a system dedicated to a single-player mode that allows only one player to play the game, or may be a system provided with a multi-player mode that allows a plurality of players to play the game. When a plurality of players play the game, a game image and game sound supplied to the players may be generated using a server or a single determination device 1, or may be generated by a distributed process using a server or a plurality of determination devices 1 connected through a network.

1-3. Method According to this Embodiment

A method of controlling a musical performance game implemented by the determination device 1 according to this embodiment is described below with reference to FIGS. 3 to 7.

1-3-1. Outline of Musical Performance Game

Figure 3:
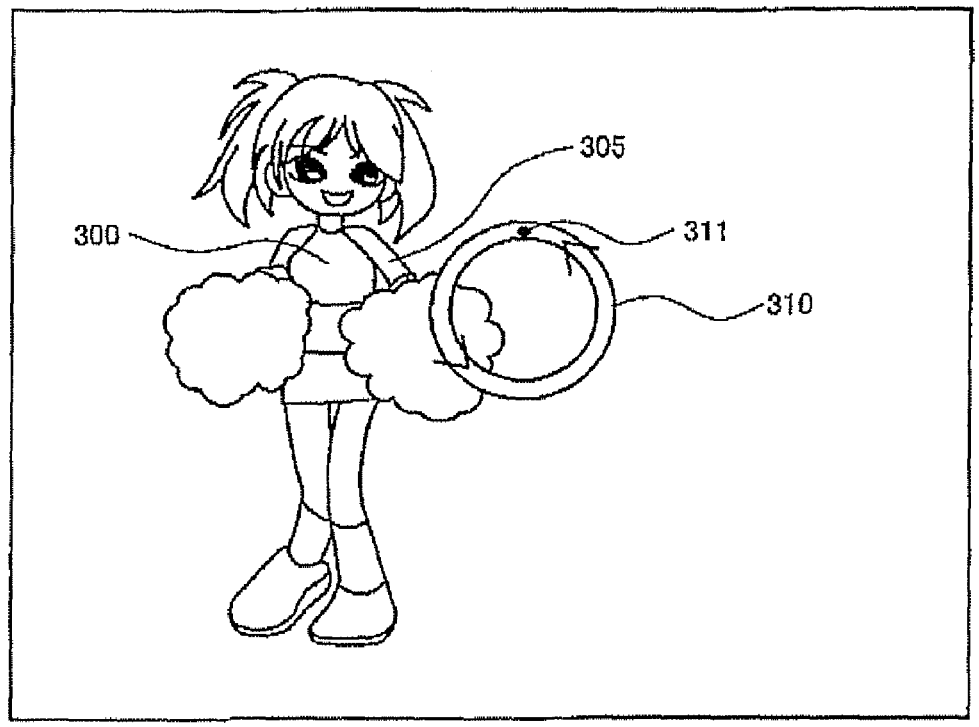
FIG. 3 shows an example of a game image of a musical performance game according to the first embodiment.
Figure 4:
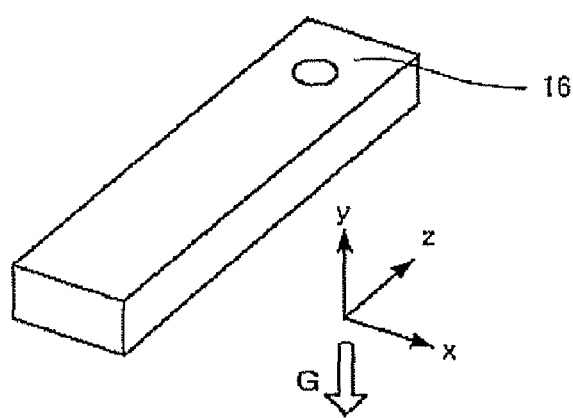
FIG. 4 is a diagram showing an example of a controller coordinate system.

An outline of the musical performance game according to this embodiment is described below with reference to FIGS. 3 and 4. FIG. 3 shows an example of a game image of the musical performance game according to this embodiment, and FIG. 4 is a diagram showing an example of the controller coordinate system.

In the musical performance game according to his embodiment, the display section 190 displays an instruction mark that instructs the player 20 to move the controller 16 in a predetermined movement pattern in synchronization with reproduction of music. The player 20 moves the controller 16 in the movement pattern indicated by the instruction mark to perform a dance movement.

In the example shown in FIG. 3, the display 19 displays a player's character 300 and an instruction mark 310 that instructs the player 20 to move the controller 16 counterclockwise from a movement star position 311 along a circular moving path around a z-axis of the controller 16 in a state in which the gravity G acts in a −y-axis direction of the controller 16. In this embodiment, as shown in FIG. 4, the coordinate system of the controller 16 (acceleration sensor 30) is defined so that the lateral direction of the controller 16 corresponds to an x axis, the vertical direction of the controller 16 corresponds to a y axis, and the back-and-forth direction (longitudinal direction) of the controller 16 corresponds to a z axis on the assumption that the controller 16 is moved in a state in which the gravity G acts in the −y-axis direction of the controller 16.

When the player 20 has moved the controller 16 in the movement pattern indicated by the instruction mark 310, the player's character 300 reproduces a dance movement corresponding to the operation of the player 20 by rotating a left arm (hand) 305 in the direction indicated by the instruction mark 310 in synchronization with the movement of the controller 16.

When the player 20 has moved the controller 16 in the movement pattern indicated by the instruction mark 310 while the instruction mark 310 is displayed on the display 19, an indication (e.g., "GREAT!") that evaluates the operation of the player 20 is displayed, and the player 20 makes a score.

On the other hand, when the player 20 has not moved the controller 16 in the movement pattern indicated by the instruction mark 310 while the instruction mark 310 is displayed on the display 19, an indication (e.g., "BAD!") that evaluates the operation of the player 20 is displayed, and the player 20 does not make a score.

According to this embodiment, the player 20 can enjoy a virtual reality game as if to actually perform a dance movement by moving the controller 16 in the movement pattern indicated by the instruction mark.

1-3-2. Input Determination Method

An input determination method according to this embodiment is described below with reference to FIGS. 5 and 6.

In the musical performance game according to this embodiment, the player 20 moves the controller 16 in synchronization with reproduction of music in the movement pattern indicated by the instruction mark to perform a dance movement.

If the determination device 1 determines whether or not the player has moved the controller 16 in a predetermined movement pattern based on whether or not all of the output values output from the acceleration sensor 30 when the player moves the controller 16 satisfy predetermined determination conditions, it is difficult for the player to satisfy the determination conditions so that the determination rate may decrease.

In this embodiment, reference data associated with a predetermined movement pattern of the controller 16 is stored in the reference data storage section 174, and the determination device 1 determines that the player has moved the controller 16 in a predetermined movement pattern when the output values (i.e., an output value equal to or larger than the value indicated by the reference data when the value indicated by the reference data is positive, or an output value equal to or smaller than the value indicated by the reference data when the value indicated by the reference data is negative) that respectively have a given relationship with values indicated by the reference data have been sequentially output from the acceleration sensor 30 in a predetermined order.

When the player moves the controller 16 in a predetermined movement pattern a predetermined number of times, the number of times that the output values hat respectively have a given relationship with values indicated by the reference data have been sequentially output from the acceleration sensor 30 in a predetermined order is counted to determine that an input that moves the controller 16 in a predetermined movement pattern a predetermined number of times has been performed corresponding to the counted number.

The details are described below with reference to FIGS. 5 and 6. FIG. 5 is a table showing an example of the reference data to be used to determine whether or not the player has moved the controller 16 in the movement pattern indicated by the instruction mark 310, and FIG. 6 is a diagram for illustrating the moving direction of the controller 16 specified by the reference data shown in FIG. 5.

Figures 5, 6:
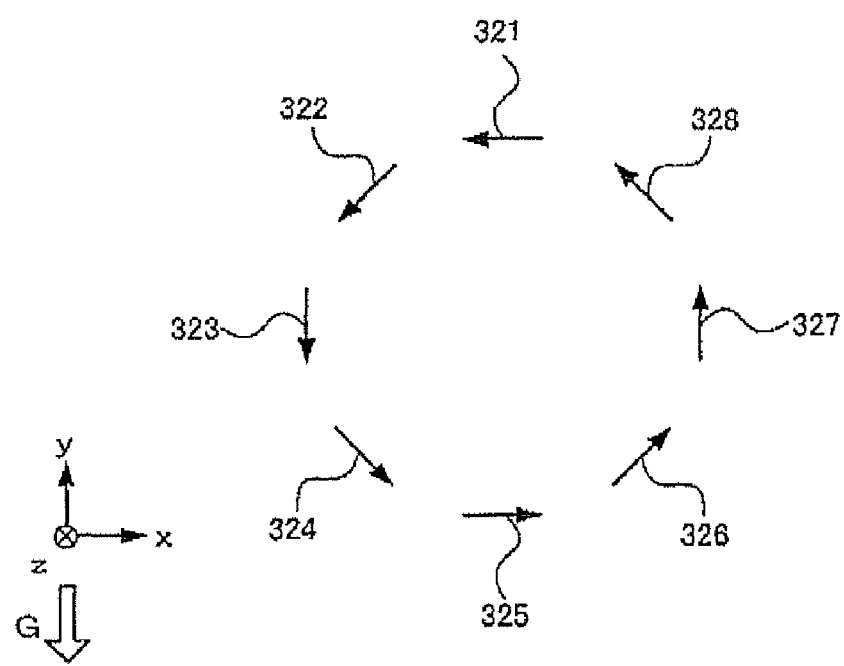
FIG. 5 is a table showing an example of reference data to be used when determining whether or not a movement pattern indicated by an instruction mark 310 has been input.
FIG. 6 is a diagram for illustrating a moving direction of a controller 16 specified by the reference data shown in FIG. 5.

In this embodiment, the determination device 1 determines whether or not the player has moved the controller 16 in the movement pattern indicated by the instruction mark 310 using reference data A to H shown in FIG. 5. Since the gravity G does not act in the x-axis direction, the x component values of the reference data A to H are symmetrical with respect to the y axis. On the other hand, since the gravity G acts in the y-axis direction, the y component values of the reference data A to H are not symmetrical with respect to the x axis.

In the reference data A, the x component value is set at 1.0, and the y component value and the z component value are set at 0.0. Specifically, the reference data A is used to determine whether or not the player has moved the controller 16 in the direction indicated by an arrow 321 shown in FIG. 6 (i.e., when the player moves the controller 16 in the direction indicated by the arrow 321 (−x-axis direction), an inertial force occurs in the +x-axis direction (i.e., direction opposite to the direction indicated by the arrow 321) so that the acceleration sensor 30 outputs a positive output value as the x component value). Therefore, the determination device 1 determines that the condition indicated by the reference data A is satisfied when the acceleration sensor 30 has output an output value equal to or larger than 1.0 as the x component value.

In the reference data B, the x component value and the y component value are set at 0.5, and the z component value is set at 0.0. Specifically, the reference data B is used to determine whether or not the player has moved the controller 16 in the direction indicated by an arrow 322 shown in FIG. 6. The determination device 1 determines that the condition indicated by the reference data B is satisfied when the acceleration sensor 30 has simultaneously output output values equal to or larger than 0.5 as the x component value and the y component value.

In the reference data C, the y component value is set at 1.0, and the x component value and the z component value are set at 0.0. Specifically, the reference data C is used to determine whether or not the player has moved the controller 16 in the direction indicated by an arrow 323 shown in FIG. 6. The determination device 1 determines that the condition indicated by the reference data C is satisfied when the acceleration sensor 30 has output an output value equal to or larger than 1.0 as the y component value.

In the reference data D, the x component value is set at −0.5, the y component value is set at 0.5, and the z component value is set at 0.0. Specifically, the reference data D is used to determine whether or not the player has moved the controller 16 in the direction indicated by an arrow 324 shown in FIG. 6. The determination device 1 determines that the condition indicated by the reference data D is satisfied when the acceleration sensor 30 has simultaneously output an output value equal to or smaller than −0.5 and an output value equal to or larger than 0.5 as the x component value and the y component value, respectively.

In the reference data E, the x component value is sat at −1.0, and the y component value and the z component value are set at 0.0. Specifically, the reference data E is used to determine whether or not the player has moved the controller 16 in the direction indicated by an arrow 325 shown in FIG. 6. The determination device 1 determines that the condition indicated by the reference data E is satisfied when the acceleration sensor 30 has output an output value equal to or smaller than −1.0 as the x component value.

In the reference data F, the x component value is set at −0.5, the y component value is set at −0.3, and the z component value is set at 0.0. Specifically, the reference data F is used to determine whether or not the player has moved the controller 16 in the direction indicated by an arrow 326 shown in FIG. 6. The determination device 1 determines that the condition indicated by the reference data F is satisfied when the acceleration sensor 30 has simultaneously output an output value equal to or smaller than −0.5 and an output value equal to or smaller than −0.3 as the x component value and the y component value, respectively.

In the reference data G, the y component value of the acceleration vector is set at −0.5, and the x component value and the z component value are set at 0.0. Specifically, the reference data G is used to determine whether or not the player has moved the controller 16 in the direction indicated by an arrow 327 shown in FIG. 6. The determination device 1 determines that the condition indicated by the reference data G is satisfied when the acceleration sensor 30 has output an output value equal to or smaller than −0.5 as the y component value.

In the reference data H, the x component value of the acceleration vector is set at 0.5, the y component value is set at −0.3, and the z component value is set at 0.0. Specifically, the reference data H is used to determine whether or not the player has moved the controller 16 in the direction indicated by an arrow 328 shown in FIG. 6. The determination device 1 determines that the condition indicated by the reference data H is satisfied when the acceleration sensor 30 has simultaneously output an output value equal to or larger than 0.5 and an output value equal to or smaller than −0.3 as the x component value and the y component value, respectively.

When the output values output from the acceleration sensor 30 have sequentially satisfied the conditions indicated by the reference data A, B, C, D, E, F, G, and H in this order, the determination device 1 determines that the player has moved the controller 16 as indicated by the arrow 321, the arrow 322, the arrow 323, the arrow 324, the arrow 375, the arrow 326, the arrow 327, and the arrow 328 in this order. This means that the player 20 has moved the controller 16 from the movement start position 311 counterclockwise around the z-axis of the controller 16 along a circular moving path in a state in which the gravity G acts in the −y-axis direction of the controller 16. Therefore, the determination device 1 determines that the player 20 has moved the controller 16 in the movement pattern indicated by the instruction mark 310.

According to this embodiment, since the determination device 1 determines whether or not the player 20 has moved the controller 16 in the movement pattern indicated by the instruction mark 310 based on whether or not the conditions indicated by the reference data A, B, C, D, E, F, G and H stored in the reference data storage section 174 have been sequentially satisfied in this order, all of the output values output from the acceleration sensor 30 when the player moves the controller 16 in the movement pattern indicated by the instruction mark 310 need not necessarily satisfy the predetermined determination conditions. Therefore, whether or not the player has moved the controller 16 in the movement pattern indicated by the instruction mark 310 can be appropriately determined without decreasing the determination rate.

According to this embodiment, when determining whether or not the controller 16 has been moved in the movement pattern indicated by the instruction mark 310 a predetermined number of times within the input reception period, the count memory 175 stores the number of times that the conditions indicated by the reference data A, B, C, D, E, F, G and H stored in the reference data storage section 174 have been satisfied in this order by the output values output from the acceleration sensor 30 within the input reception period. In this case, the determination device 1 determines that the player 20 has moved the controller 16 in the predetermined movement pattern a number of times corresponding to the count value.

Specifically, since the determination device 1 determines whether or not the player 20 has moved the controller 16 in the movement pattern indicated by the instruction mark 310 a predetermined number of times within the input reception period based on the number of times (count value) that the conditions indicated by the reference data A, B, C, D, E, F, G, and H stored in the reference data storage section 174 have been satisfied in this order by the output values output from the acceleration sensor 30, all of the output values need not necessarily satisfy the predetermined determination conditions when the player moves the controller 16 in the movement pattern indicated by the instruction mark 310. Therefore, whether or not the player has moved the controller 16 in the movement pattern indicated by the instruction mark 310 a predetermined number of times can be determined without decreasing the determination rate. According to this embodiment, since the determination device 1 can determine that the payer has moved the controller 16 in the movement pattern indicated by the instruction mark 310 a number of times corresponding to the count value, various game processes can be implemented.

An example in which the player moves the controller 16 in the movement pattern indicated by the instruction mark 310 three times within the input reception period is described below. For example, when the count value stored in the count memory 175 is three so that the determination device 1 determines that the player has moved the controller 16 in the movement pattern indicated by the instruction mark 310 three times, an indication (e.g., "GREAT!") that evaluates the operation of the player 20 is displayed, and the player 20 makes a high score. When the count value stored in the count memory 175 is two so that the determination device 1 determines that the player has moved the controller 16 in the movement pattern indicated by the instruction mark 310 twice, an indication (e.g., "GOOD!") that evaluates the operation of the player 20 is displayed and the player 20 makes a normal score. When the count value stored in the count memory 175 is one so that the determination device 1 determines that the player has moved the controller 16 in the movement pattern indicated by the instruction mark 310 once, an indication (e.g., "POOR!") that evaluates the operation of the player 20 is displayed, and the player 20 makes a low score. When the count value stored in the count memory 175 is zero so that the determination device 1 determines that the player has not moved the controller 16 in the movement pattern indicated by the instruction mark 310, an indication (e.g., "BAD!") that evaluates the operation of the player 20 is displayed, and the player 20 does not make a score.

In this embodiment, since the player makes a high score and is rated highly (i.e., obtains benefits) when the count value is large (i.e., the degree of conformity is high), a more interesting musical performance game can be implemented.

The input reception periods may be provided corresponding to the number of times that the player moves of the controller 16 in the movement pattern indicated by the instruction mark 310.

For example, when the player moves the controller 16 in the movement pattern indicated by the instruction mark 310 three times, a first input reception period to a third input reception period may be provided. The determination device 1 may determine whether or not the player has moved the controller 16 in the movement pattern indicated by the instruction mark 310 within the first input reception period, determine whether or not the player has again moved the controller 16 in the movement pattern indicated by the instruction mark 310 within the second input reception period, and determine whether or not the player has again moved the controller 16 in the movement pattern indicated by the instruction mark 310 within the third input reception period.

The determination device 1 may receive an input that moves the controller 16 in the movement pattern indicated by the instruction mark 310 a predetermined number of times on condition that the count value has reached a predetermined number.

For example, the determination device 1 receives an input that moves the controller 16 in the movement pattern indicated by the instruction mark 310 three times on condition that the count value stored in the count memory 175 is three. In this case, an indication (e.g., "GREAT!") that evaluates the operation of the player 20 is displayed, and the player 20 makes a score. On the other hand, the determination device 1 does not receive an input that moves the controller 16 in the movement pattern indicated by the instruction mark 310 three times when the count value stored in the count memory 175 is not three. In this case, an indication (e.g., "BAD!") that evaluates the operation of the player 20 is displayed, and the player 20 does not make a score.

The reference data A to H stored in the reference data storage section 174 may be determined based on the output values output from the acceleration sensor 30 when the player 20 has moved the controller 16 from the movement start position 311 counterclockwise around the z-axis of the controller 16 in a state in which the gravity G acts in the −y-axis direction of the controller 16. In this case, the player 20 may move the controller 16 from the movement start position 311 counterclockwise around the z-axis of the controller 16 in a state in which the gravity G acts in the −y-axis direction of the controller 16 before the game starts, and the reference data A to H stored in the reference data storage section 174 may be determined based on the output values output from the acceleration sensor 30 when the player 20 has moved the controller 16. For example, the largest x component value selected from the output values output from the acceleration sensor 30 when the player 20 has moved the controller 16 is used as the reference data A. A value obtained by adjusting the output value output from the acceleration sensor 30 (i.e., a value obtained by increasing or decreasing the output value output from the acceleration sensor 30) may be used as the reference data so that the condition indicated by the reference data is easily satisfied. Therefore, reference data A to H appropriate for the movement of the controller 16 by the player 20 can be set.

1-3-3. Process According to this Embodiment

Figure 7:
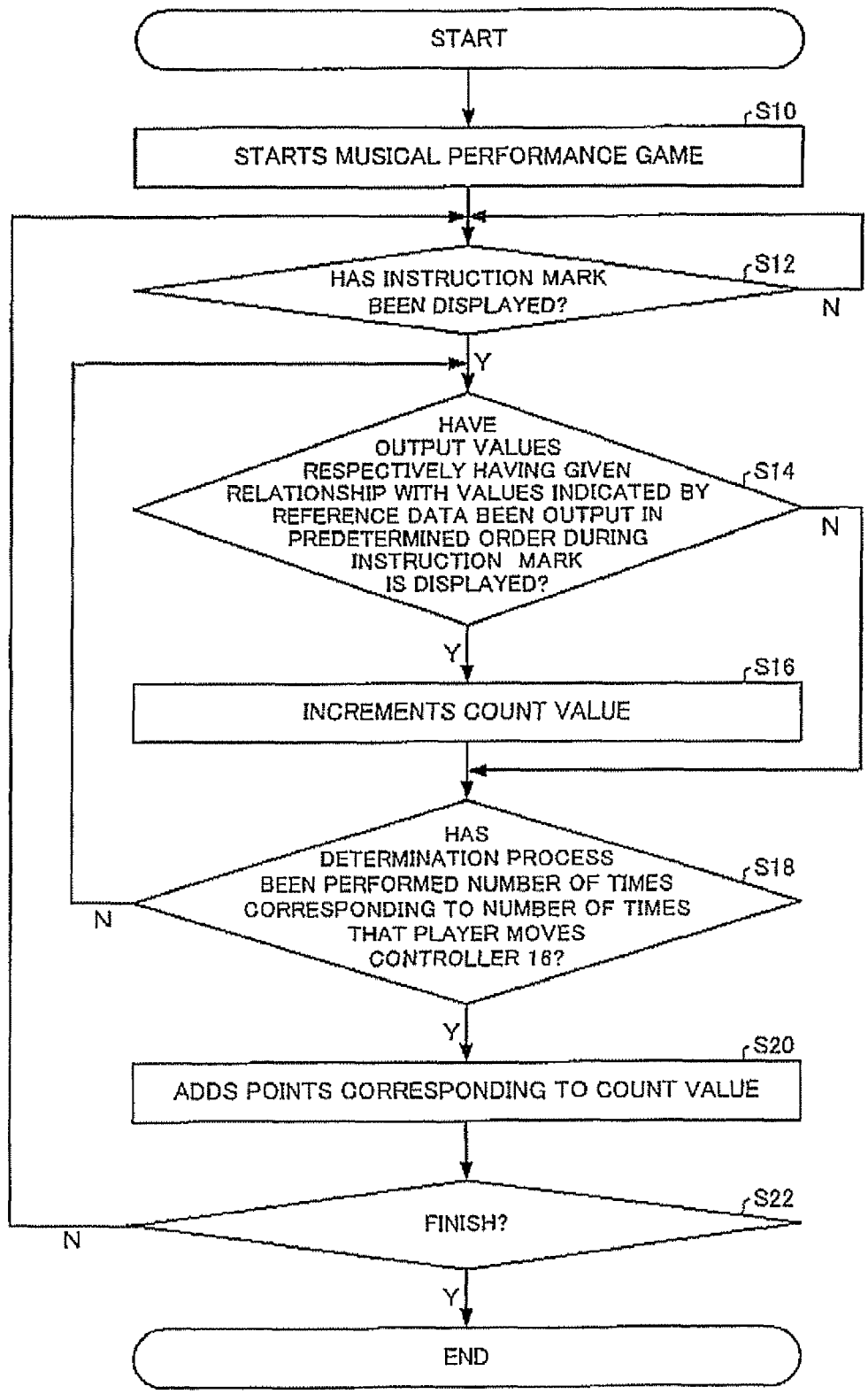
FIG. 7 is a flowchart for describing an example of a process according to the fast embodiment.

An example of the process according to this embodiment is described below with reference to FIG. 7. FIG. 7 is a flowchart for describing an example of the process according to this embodiment.

When a game stage in which the player plays the musical performance game has been selected from a plurality of game stages, the determination device 1 starts the musical performance game, and reproduces music corresponding to the selected game stage, for example (step S10).

The determination device 1 causes the display 19 to display the instruction mark that instructs the player 20 to move the controller 16 in a predetermined movement pattern a predetermined number of times (Y in step S12), and determines whether or not output values that respectively have a given relationship with values indicated by the reference data have been output from the acceleration sensor 30 in a predetermined order during the instruction mark is displayed (step S14). When the determination device 1 has determined that output values that satisfy a given relationship with values indicated by each of a plurality of pieces of reference data have been output from the acceleration sensor 30 in a predetermined order (Y in step S14), the determination device 1 increments the count value (step S16).

The determination device 1 repeats the process in the steps S14 to S16 until the determination device 1 performs the determination process in the step S14 a number of times corresponding to the predetermined number of times that the player 20 moves the controller 16 (N in step S18). When the determination device 1 has performed the determination process in the step S14 a number of times corresponding to the predetermined number of times that the player 20 moves the controller 16 (Y in step S18), the determination device 1 adds points corresponding to the count value to the score of the player 20 (step S20).

The determination device 1 repeats the process in the steps S12 to S20 until the music ends (N in step S22). When the music has ended, the determination device 1 fishes the musical performance game (Y in step S22).

2. Second Embodiment

A second embodiment of the invention will now be described below. Note that the embodiment described below does not unduly limit the scope of the invention as stated in the claims. Also, not all the elements described in this embodiment should be taken as essential requirements of the invention.

A determination device 1 according to the second embodiment has an external configuration similar to that of the determination device 1 according to the first embodiment. Therefore, description of the external configuration of the determination device 1 according to the second embodiment is omitted. The configuration of the functional blocks of the determination device 1 according to the second embodiment is described below with reference to FIG. 2. The following description mainly focuses on the difference between the configuration of the functional blocks of the determination device 1 according to the second embodiment and the configuration of the functional blocks of the determination device 1 according to the first embodiment.

2-1. Functional Blocks of Determination Device

In this embodiment, the determination section 114 shown in FIG. 2 determines whether or not output values that respectively have a given relationship with values indicated by the reference data stored in the reference data storage section 174 have been output from the sensor 162 in one of a plurality of predetermined orders within the input reception period in which an input that moves the controller 16 in a predetermined movement pattern is received, differing from the first embodiment. The term "output values that respectively have a given relationship with the values indicated by the reference data" includes an output value larger than the value indicated by the reference data, an output value equal to or larger than the value indicated by the reference data, an output value equal to or smaller than the value indicated by the reference data, and an output value smaller than the value indicated by the reference data. For example, when the game is a musical performance game, the determination section 114 determines whether or not output values (i.e., an output value equal to or larger than the value indicated by the reference data when the value indicated by the reference data is positive, or an output value equal to or smaller than the value indicated by the reference data when the value indicated by the reference data is negative) that respectively have a given relationship with values indicated by the reference data stored in the reference data storage section 174 have been output from the sensor 162 in one of a plurality of predetermined orders within a period (i.e., input reception period) in which an instruction mark that instructs the player 20 to move the controller 16 in a predetermined movement pattern is displayed. In this embodiment, since the determination section 114 performs the determination process every frame, the determination section 114 performs the determination process using a plurality of output values. The plurality of predetermined orders may be set in a program, or order determination data may be stored in the storage section 170.

2-2. Method According to this Embodiment

A method of controlling a musical performance game implemented by the determination device 1 according to this embodiment is described below with reference to FIGS. 10 to 22.

2-2-1. Outline of Musical Performance Game

Figure 10:
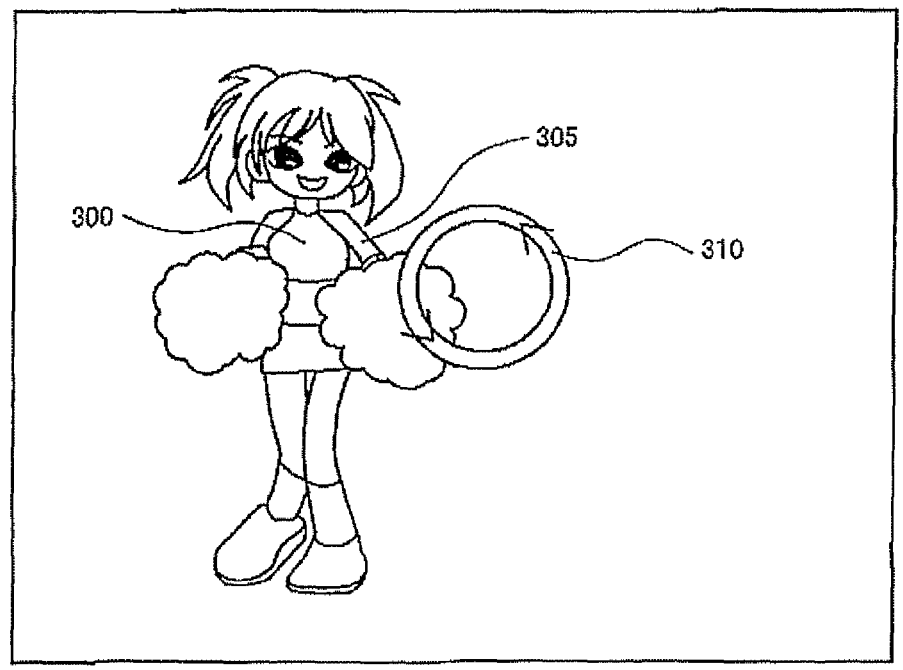
FIG. 10 shows an example of a game image of a musical performance game according to a second embodiment of the invention.
Figure 11:
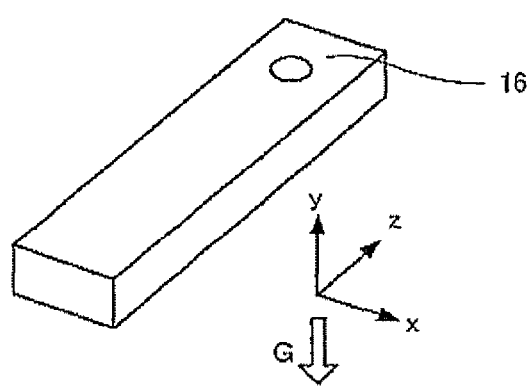
FIG. 11 is a diagram showing an example of a controller coordinate system.

An outline of the musical performance game according to this embodiment is described below with reference to FIGS. 10 and 11. FIG. 10 shows an example of a game image of the musical performance game according to this embodiment, and FIG. 11 is a diagram showing an example of the controller coordinate system.

In the musical performance game according to this embodiment, the display section 190 displays an instruction mark that instructs the player 20 to move the controller 16 in a predetermined movement pattern in synchronization with reproduction of music. The player 20 moves the controller 16 in the movement pattern indicated by the instruction mark to perform a dance movement.

In the example shown in FIG. 10, the display 19 displays a player's character 300 and an instruction mark 310 that instructs the player 20 to move the controller 16 counter-clockwise along a circular moving path around a z-axis of the controller 16 in a state in which the gravity G acts in a −y-axis direction of the controller 16. In this embodiment as shown in FIG. 11, the coordinate system of the controller 16 (acceleration sensor 30) is defined so that the lateral direction of the controller 16 corresponds to an x axis, the vertical direction of the controller 16 corresponds to a y axis, and the back-and-forth direction (longitudinal direction) of the controller 16 corresponds to a z axis on the assumption that the controller 16 is moved in a state in which the gravity G acts in the −y-axis direction of the controller 16.

When the player 20 has moved the controller 16 in the movement pattern indicated by the instruction mark 310, the player's character 300 reproduces a dance movement corresponding to the operation of the player 20 by rotating a left arm (hand) 305 in the direction indicated by the instruction mark 310 in synchronization with the movement of the controller 16.

When the player 20 has moved the controller 16 in the movement pattern indicated by the instruction mark 310 while the instruction mark 310 is displayed on the display 19, an indication (e.g., "GREAT!") that highly evaluates the operation of the player 20 is displayed, and the player 20 makes a score. On the other hand, when the player 20 has not moved the controller 16 in the movement pattern indicated by the instruction mark 310 while the instruction mark 310 is displayed on the display 19, an indication (e.g., "BAD!") that evaluates the operation of the player 20 is displayed, and the player 20 does not make a score.

According to this embodiment, the player 20 can enjoy a virtual reality game as if to actually perform a dance movement by moving the controller 16 in the movement pattern indicated by the instruction mark.

2-2-2. Input Determination Method

An input determination method according to this embodiment is described below with reference to FIGS. 12 to 21H.

Figures 12, 13:
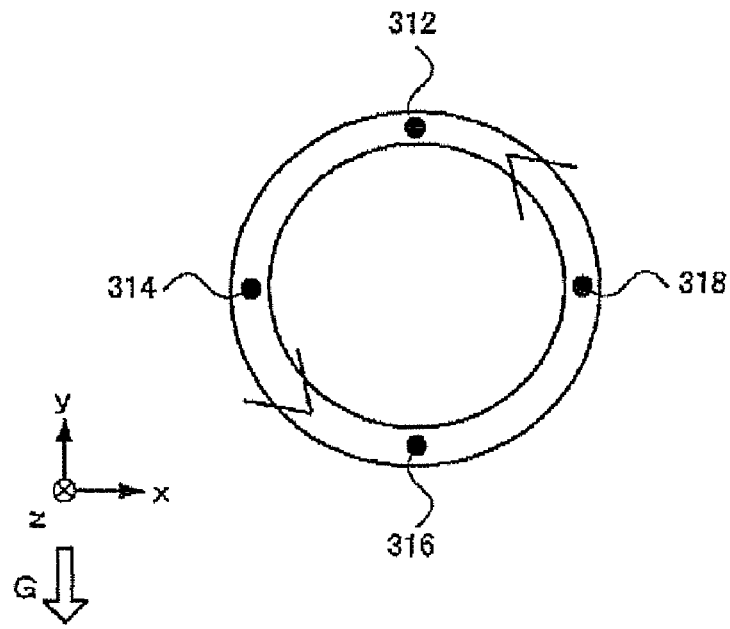
FIG. 12 is a diagram for illustrating a difference in output value output from an acceleration sensor 30 due to a difference in movement start position of a controller 16.
FIG. 13 is a table showing an example of reference data to be used when determining whether or not a movement pattern indicated by an instruction mark 310 has been input.

In the musical performance game according to this embodiment, the instruction mark does not specify the movement start position and the movement finish position in order to allow various movement patterns of the controller 16 (see FIG. 10). When the movement start position and the movement finish position when the player moves the controller 16 vary, the output values (acceleration vectors) output from the acceleration sensor 30 when the player moves the controller 16 also vary. This point is described below with reference to FIG. 12. FIG. 12 is a diagram for illustrating the difference in the output value output from the acceleration sensor 30 due to the difference in the movement start position of the controller 16.

When the player moves the controller 16 counterclockwise around the z-axis of the controller 16 in a state in which the gravity G acts in the −y-axis direction of the controller 16, the player moves the controller 16 in the −x-axis direction at a point 312. In this case, since an inertial force acts on the acceleration sensor 30 (controller 16) in the +x-axis direction, the acceleration sensor 30 outputs a positive output value as the x component value. Since the gravity G acts on the acceleration sensor 30 in the −y-axis direction, the acceleration sensor 30 outputs a negative output value as the y component value.

The player moves the controller 16 in the −y-axis direction at a point 314. In this case, since an inertial force acts on the acceleration sensor 30 in the +y-axis direction and the gravity G acts on the acceleration sensor 30 in the −y-axis direction, the acceleration sensor 30 outputs a positive output value or a negative output value of which the absolute value is smaller than that of the y component value output when the controller 16 is stationary as the y component value.

The player moves the controller 16 in the +x-axis direction at a point 316. In this case, since an inertial force acts on the acceleration sensor 30 in the −x-axis direction, the acceleration sensor 30 outputs a negative output value as the x component value. Since the gravity G acts on the acceleration sensor 30 in the −y-axis direction, the acceleration sensor 30 outputs a negative output value as the y component value.

The player moves the controller 16 in the +y-axis direction at a point 318. In this case, since an inertial force acts on the acceleration sensor 30 in the −y-axis direction, and the gravity G acts on the acceleration sensor 30 in the −y-axis direction, the acceleration sensor 30 outputs a negative output value of which the absolute value is larger than that of the y component value output when the controller 16 is stationary as the y component value.

Specifically, since the output value output from the acceleration sensor 30 varies corresponding to the movement position (moving direction) of the controller 16, the output value output from the acceleration sensor 30 during the movement of the controller 16 varies when the movement start position and the movement finish position when the player moves the controller 16 vary. When providing the determination data corresponding to the movement start position and the movement finish position of the controller 16 in order to deal with the case where the player moves the controller 16 from an arbitrary position, the amount of data increases to a large extent. Moreover, the determination process becomes complicated.

Figures 14, 15:
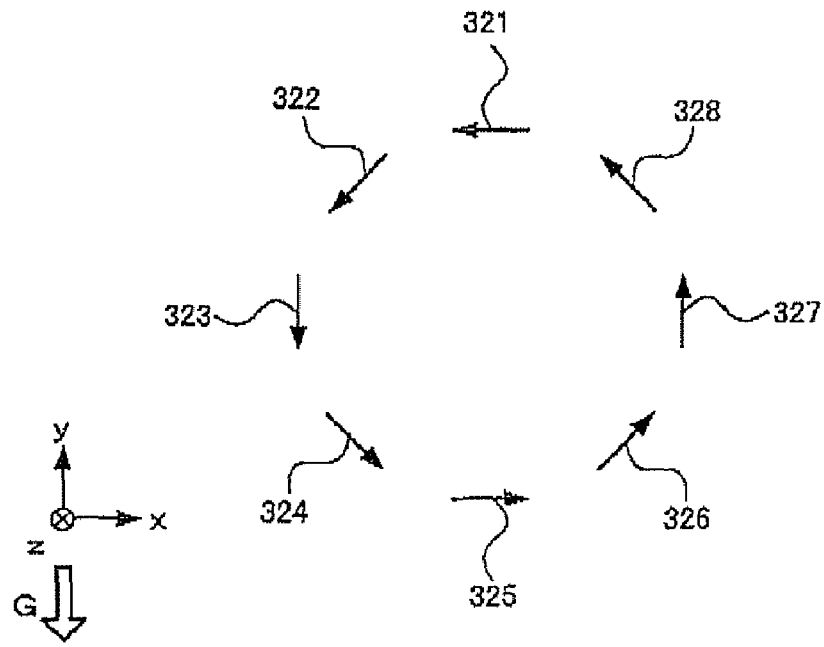
FIG. 14 is a diagram for illustrating a moving direction of a controller 16 specified by the reference data shown in FIG. 13.
FIG. 15 is a table showing orders of the reference data in FIG. 13 having a given relationship with detected data.

In this embodiment, reference data associated with a predetermined movement pattern of the controller 16 is stored in the reference data storage section 174, and the determination device 1 determines that the player has moved the controller 16 in a predetermined movement pattern when the output values (i.e., an output value equal to or larger than the value indicated by the reference data when the value indicated by the reference data is positive, or an output value equal to or smaller than the value indicated by the reference data when the value indicated by the reference data is negative) that respectively have a given relationship with values indicated by the reference data have been sequentially output from the acceleration sensor 30 in one of a predetermined plurality of orders. The details are described below with reference to FIGS. 13 to 15. FIG. 13 is a table showing an example of the reference data to be used to determine whether or not the player has moved the controller 16 in the movement pattern indicated by the instruction mark 310, and FIG. 14 is a diagram for illustrating the moving direction of the controller 16 specified by the reference data shown in FIG. 13. FIG. 15 is a table showing orders that satisfy a condition indicated by the reference data shown in FIG. 13.

In this embodiment, the determination device 1 determines whether or not the player has moved the controller 16 in the movement pattern indicated by the instruction mark 310 using reference data A to H shown in FIG. 13. Since the gravity G does not act in the x-axis direction, the x component values of the reference data A to H are symmetrical with respect to the y axis. On the other hand, since the gravity G acts in the y-axis direction, the y component values of the reference data A to H are not symmetrical with respect to the x axis.

In the reference data A, the x component value is set at 1.0, and the y component value and the z component value are set at 0.0. Specifically, the reference data A is used to determine whether or not the player has moved the controller 16 in the direction indicated by an arrow 321 shown in FIG. 14 (i.e., when the player moves the controller 16 in the direction indicated by the arrow 321 (−x-axis direction), an inertial force occurs in the +x-axis direction (i.e., direction opposite to the direction indicated by the arrow 321) so that the acceleration sensor 30 outputs a positive output value as the x component value). Therefore, the determination device 1 determines that the condition indicated by the reference data A is satisfied when the acceleration sensor 30 has output an output value equal to or larger than 1.0 as the x component value.

In the reference data B, the x component value and the y component value are set at 0.5, and the z component value is set at 0.0. Specifically, the reference data B is used to determine whether or not the player has moved the controller 16 in the direction indicated by an arrow 322 shown in FIG. 14. The determination device 1 determines that the condition indicated by the reference data 13 is satisfied when the acceleration sensor 30 has simultaneously output output values equal to or larger than 0.5 as the x component value and the y component value.

In the reference data C, the y component value is set at 1.0, and the x component value and the z component value are set at 0.0. Specifically, the reference data C is used to determine whether or not the player has moved the controller 16 in the direction indicated by an arrow 323 shown in FIG. 14. The determination device 1 determines that the condition indicated by the reference data C is satisfied when the acceleration sensor 30 has output an output value equal to or larger than 1.0 as the y component value.

In the reference data D, the x component value is set at −0.5, the y component value is set at 0.5, and the z component value is set at 0.0. Specifically, the reference data D is used to determine whether or not the player has moved the controller 16 in the direction indicated by an arrow 324 shown in FIG. 14. The determination device 1 determines that the condition indicated by the reference data D is satisfied when the acceleration sensor 30 has simultaneously output an output value equal to or smaller than −0.5 and an output value equal to or larger than 0.5 as the x component value and the y component value, respectively.

In the reference data E, the x component value is set at −1.0, and the y component value and the z component value are set at 0.0. Specifically, the reference data E is used to determine whether or not the player has moved the controller 16 in the direction indicated by an arrow 325 shown in FIG. 14. The determination device 1 determines that the condition indicated by the reference data E is satisfied when the acceleration sensor 30 has output an output value equal to or smaller than −1.0 as the x component value.

In the reference data F, the x component value is set at −0.5, the y component value is set at −0.3, and the z component value is set at 0.0. Specifically, the reference data F is used to determine whether or not the player has moved the controller 16 in the direction indicated by an arrow 326 shown in FIG. 14. The determination device 1 determines that the condition indicated by the reference data F is satisfied when the acceleration sensor 30 has simultaneously output an output value equal to or smaller than −0.5 and an output value equal to or smaller than −0.3 as the x component value and the y component value, respectively.

In the reference data G, the y component value of the acceleration vector is set at −0.5, and the x component value and the z component value are set at 0.0. Specifically, the reference data G is used to determine whether or not the player has moved the controller 16 in the direction indicated by an arrow 327 shown in FIG. 14. The determination device 1 determines that the condition indicated by the reference data G is satisfied when the acceleration sensor 30 has output an output value equal to or smaller than −0.5 as the y component value.

In the reference data H, the x component value of the acceleration vector is set at 0.5, the y component value is set at −0.3, and the z component value is set at 0.0. Specifically, the reference data H is used to determine whether or not the player has moved the controller 16 in the direction indicated by an arrow 328 shown in FIG. 14. The determination device 1 determines that the condition indicated by the reference data H is satisfied when the acceleration sensor 30 has simultaneously output an output value equal to or larger than 0.5 and an output value equal to or smaller than −0.3 as the x component value and the y component value, respectively.

When the conditions indicated by the reference data A to H have been satisfied in one of the orders shown in FIG. 15 (i.e., the player has moved the controller 16 counterclockwise around the z-axis of the controller 16 in a state in which the gravity G acts in the −y-axis direction of the controller 16 (see FIG. 14)), the determination device 1 determines that the player has moved the controller 16 in the movement pattern indicated by the instruction mark 310.

According to this embodiment, since the determination device 1 determines whether or not the player has moved the controller 16 in the movement pattern indicated by the instruction mark 310 based on whether or not the conditions indicated by the reference data A to H stored in the reference data storage section 174 have been satisfied in one of the orders shown in FIG. 15, the determination device 1 can determine whether or not the player has moved the controller 16 in the movement pattern indicated by the instruction mark 310 irrespective of the movement start position of the controller 16.

The reference data A to H stored in the reference data storage section 174 may be determined based on the output values output from the acceleration sensor 30 when the player 20 has moved the controller 16 counterclockwise around the z-axis of the controller 16 in a state in which the gravity G acts in the −y-axis direction of the controller 16. In this case, the player 20 may move the controller 16 from the movement start position 311 counterclockwise around the z-axis of the controller 16 in a state in which the gravity G acts in the −y-axis direction of the controller 16 before the game starts, and the reference data A to H stored in the reference data storage section 174 may be determined based on the output values output from the acceleration sensor 30 when the player 20 has moved the controller 16. For example, the largest x component value selected from the output values output from the acceleration sensor 30 when the player 20 has moved the controller 16 is used as the reference data A. A value obtained by adjusting the output value output from the acceleration sensor 30 (i.e., a value obtained by increasing or decreasing the output value output from the acceleration sensor 30) may be used as the reference data so that the condition indicated by the reference data is easily satisfied. Therefore, reference data A to H appropriate for the movement of the controller 16 by the player 20 can be set.

Figure 16:
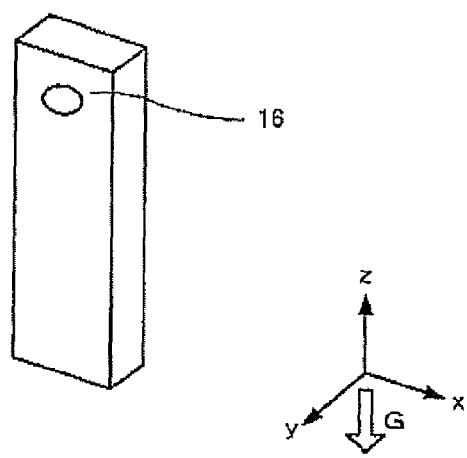
FIG. 16 is a diagram showing an example of a controller coordinate system.
Figure 17:
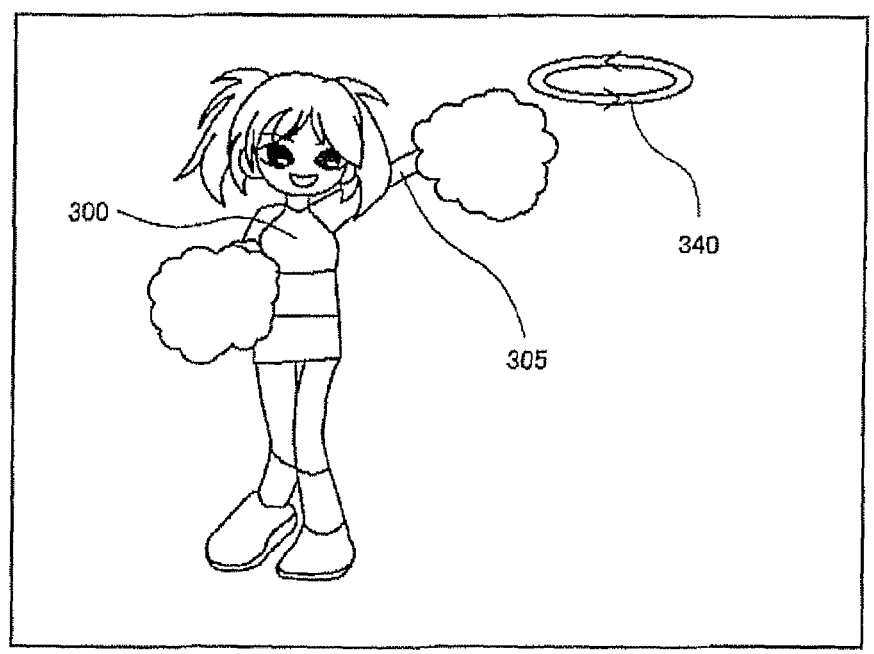
FIG. 17 shows an example of a game image of a musical performance game according to the second embodiment.
Figure 20:
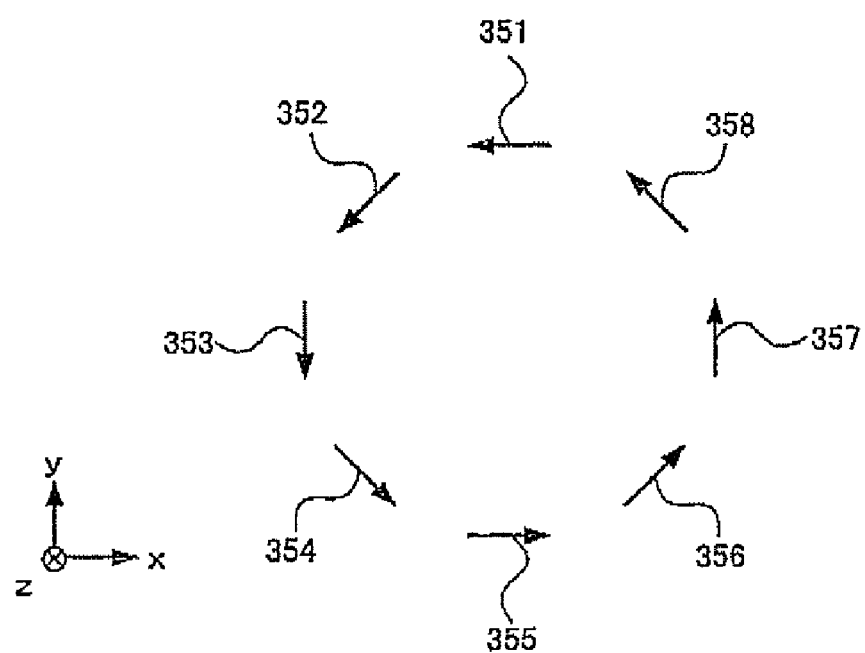
FIG. 20 is a diagram for illustrating a moving direction of a controller 16 specified by the reference data shown in FIG. 18.

The above description has been given taking an example in which the player moves the controller 16 in a state in which the gravity G acts in the −y-axis direction of the controller 16 (see FIG. 11). An example in which the player moves the controller 16 in a state in which the gravity G acts in the −z-axis direction of the controller 16 (see FIG. 16) is described below with reference to FIGS. 16 to 21H. FIG. 16 is a diagram showing an example of the controller coordinate system. FIG. 17 shows an example of a game image of the musical performance game according to this embodiment. FIG. 18 is a table showing an example of reference data to be used when determining whether or not the player has moved the controller in a movement pattern indicated by an instruction mark 340. FIG. 19 is a table showing orders that satisfy the conditions indicated by the reference data shown in FIG. 18. FIG. 20 is a diagram for illustrating the moving direction of the controller 16 specified by the reference data shown in FIG. 18. FIGS. 21A to 21H are diagrams showing examples of the acceptable direction of the controller 16 when the player moves the controller 16 in the movement pattern indicated by the instruction mark 340.

In the example shown in FIG. 17, the display 19 displays the player's character 300 and the instruction mark 340 that instructs the player to move the controller 16 counterclockwise around the z-axis of the controller 16 along a circular path in a state in which the gravity G acts in the −z-axis direction of the controller 16.

The determination device 1 determines whether or not the player has moved the controller 16 in the movement pattern indicated by the instruction mark 340 using reference data A' to H' shown in FIG. 18. When the conditions indicated by the reference data A' to H' have been satisfied in one of the orders shown in FIG. 19 (i.e., the player has moved the controller 16 counterclockwise around the z-axis of the controller 16 along a circular path in a state in which the gravity G acts in the −z-axis direction of the controller 16 (see FIG. 20)), the determination device 1 determines that the player has moved the controller 16 in the movement pattern indicated by the instruction mark 340.

The reference data A' is used to determine whether or not the player has moved the controller 16 in the direction indicated by an arrow 351 shown in FIG. 20. The reference data B' is used to determine whether or not the player has moved the controller 16 in the direction indicated by an arrow 352 shown in FIG. 20. The reference data C' is used to determine whether or not the player has moved the controller 16 in the direction indicated by an arrow 353 shown in FIG. 20. The reference data D' is used to determine whether or not the player has moved the controller 16 in the direction indicated by an arrow 354 shown in FIG. 20. The reference data E' is used to determine whether or not the player has moved the controller 16 in the direction indicated by an arrow 355 shown in FIG. 20. The reference data F' is used to determine whether or not the player has moved the controller 16 in the direction indicated by an arrow 356 shown in FIG. 20. The reference data G' is used to determine whether or not the player has moved the controller 16 in the direction indicated by an arrow 357 shown in FIG. 20. The reference data H' is used to determine whether or not the player has moved the controller 16 in the direction indicated by an arrow 358 shown in FIG. 20. The details of the reference data A' to H' are omitted.

Figure 21A:
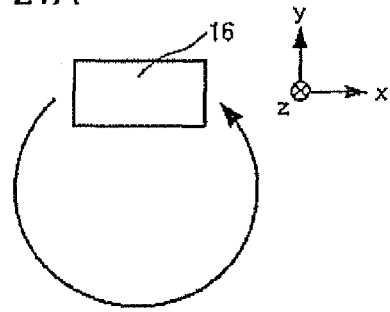
FIGS. 21A to 21H are diagrams showing examples of an allowable direction of a controller 16 when moving the controller 16 in a movement pattern indicated by the instruction mark 340.

When the player moves the controller 16 along an arrow shown in FIG. 21A while holding the controller 16 in the direction shown in FIG. 21A (i.e., the player moves the controller 16 counterclockwise around the z-axis along a circular path in a state in which the gravity G acts in the −z-axis direction), the conditions indicated by the reference data A', B', C', D', E', F', G', and H' are satisfied in his order.

When the gravity G acts in the −z-axis direction, since the gravity G acts in the x-axis direction and the y-axis direction, the coordinates of the reference data A' to H' are rotationally symmetrical at 90°, 180°, 270°, and 360° around the z axis. Specifically, the coordinates of the reference data A' to H' have four-fold rotational symmetry. The term "rotational symmetry" means that a moving path (coordinates) coincides before and after rotation when rotating the moving path (coordinates) around an axis. The term "four-fold rotational symmetry" means that a moving path (coordinates) coincides four times when rotating the moving path (coordinates) around an axis in the range from 0° to 360°.

A circular moving path (coordinates) necessarily coincides before and after rotation when rotating the circular moving path (coordinates) around an axis in the range from 0° to 360°.

Therefore, when the player 20 moves the controller 16 in the movement pattern indicated by the instruction mark 340, the determination device 1 can appropriately determine the movement pattern of the controller 16 irrespective of the movement start position and the inclination (direction) of the controller 16 insofar as the gravity G acts in the −z-axis direction.

Figure 21E:
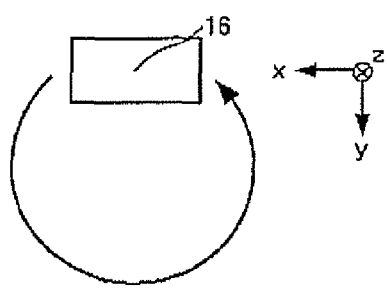
Figure 21B:
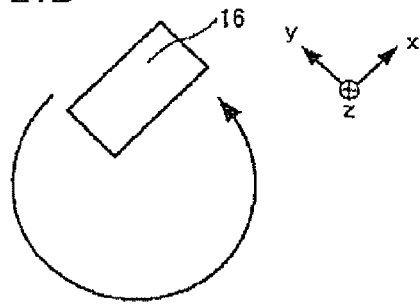

For example, when the player moves the controller 16 along the arrow shown in FIG. 21A in a state in which the controller 16 is rotated counterclockwise around the z-axis from the direction of the controller 16 shown in FIG. 21A by 0° to 45° (FIG. 21B shows a state in which the controller 16 is rotated by 45°), the conditions indicated by the reference data H', A', B', C', D', E', F' and G' are satisfied in this order.

Figure 21F:
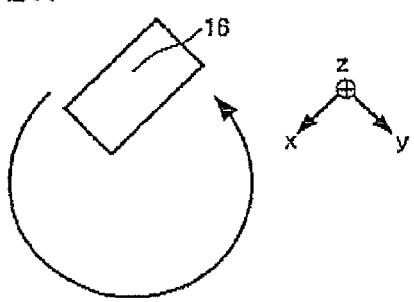
Figure 21C:
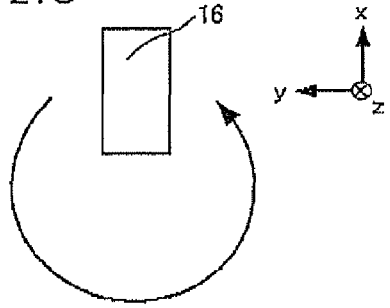

When the player moves the controller 16 along the arrow shown in FIG. 21A in a state in which the controller 16 is rotated counterclockwise round the z-axis from the direction of the controller 16 shown in FIG. 21A by 45° to 90° (FIG. 21C shows a state in which the controller 16 is rotated by 90°), the conditions indicated by the reference data G', H', A', B', C', D', E', and F' are satisfied in this order.

Figure 21G:
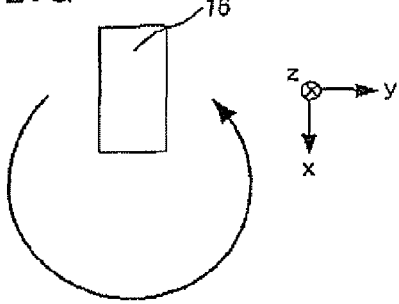
Figure 21D:
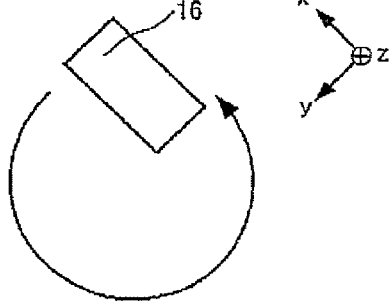

When the player moves the controller 16 along the arrow shown in FIG. 21A in a state in which the controller 16 is rotated counterclockwise around the z-axis from the direction of the controller 16 shown in FIG. 21A by 90° to 135° (FIG. 21D shows a state in which the controller 16 is rotated by 135°), the conditions indicated by the reference data F', G', H', A', B', C', D', and E' are satisfied in this order.

When the player moves the controller 16 along the arrow shown in FIG. 21A in a state in which the controller 16 is rotated counterclockwise around the z-axis from the direction of the controller 16 shown in FIG. 21A by 135° to 180° (FIG. 21E shows a state in which the controller 16 is rotated by 180°), the conditions indicated by the reference data E', F', G', H', A', B', C', and D' are satisfied in this order.

When the player moves the controller 16 along the arrow shown in FIG. 21A in a state in which the controller 16 is rotated counterclockwise around the z-axis from the direction of the controller 16 shown in FIG. 21A by 180° to 225° (FIG. 21F shows a state in which the controller 16 is rotated by 225°), the conditions indicated by the reference data D', E', F', G', H', A', B', and C' are satisfied in this order.

When the player moves the controller 16 along the arrow shown in FIG. 21A in a state in which the controller 16 is rotated counterclockwise around the z-axis from the direction of the controller 16 shown in FIG. 21A by 225° to 270° (FIG. 21G shows a state in which the controller 16 is rotated by 270°), the conditions indicated by the reference data C', D', E', F', G', H', A', and B' are satisfied in this order.

Figure 21H:
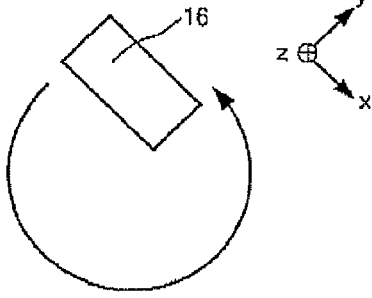

When the player moves the controller 16 along the arrow shown in FIG. 21A in a state in which the controller 16 is rotated counterclockwise around the z-axis from the direction of the controller 16 shown in FIG. 21A by 270° to 315° (FIG. 21H shows a state in which the controller 16 is rotated by 315°), the conditions indicated by the reference data B', C', D', E', F', G', H', and A' are satisfied in this order.

When the player moves the controller 16 along the arrow shown in FIG. 21A in a state in which the controller 16 is rotated counterclockwise around the z-axis from the direction of the controller 16 shown in FIG. 21A by 315° to 360°, the conditions indicated by the reference data A', B', C', D', E°, F', G', and H' are satisfied in this order.

Although this embodiment employs a circular moving path that necessarily coincides before and after rotation when rotating the circular moving path around an axis in the age from 0° to 360°, a square moving path that has four-fold rotational symmetry may also be employed, for example. In this case, if the coordinates of the reference data associated with the square moving path have four-fold rotational symmetry, the movement pattern of the controller 16 can be appropriately determined even when the controller 16 is moved along the square moving path in a state in which the controller 16 is rotated by 90°, 180°, 270°, or 360°.

2-2-3. Process According to This Embodiment

Figure 22:
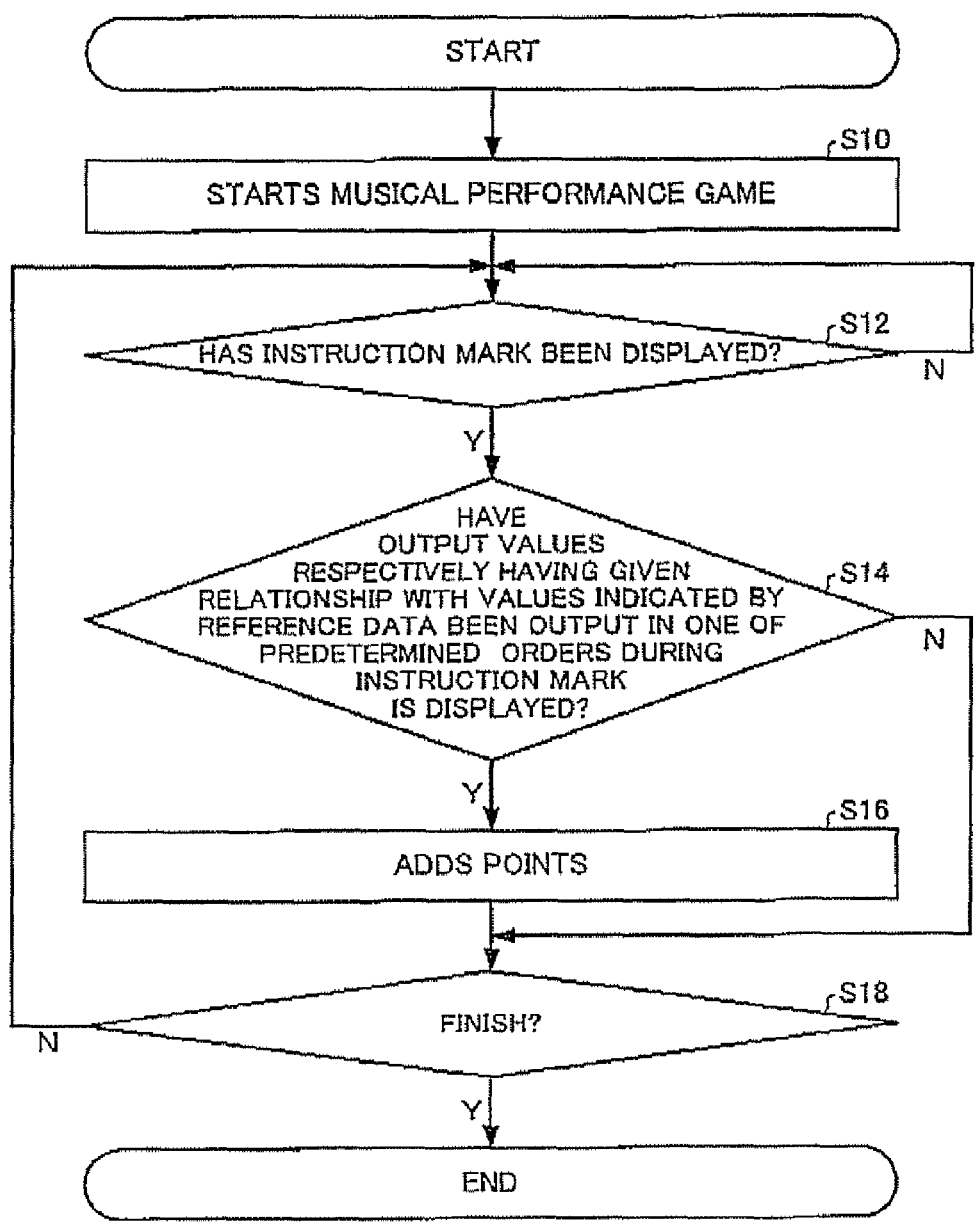
FIG. 22 is a flowchart for describing an example of a process according to the second embodiment.

An example of the process according to this embodiment is described below with reference to FIG. 22. FIG. 22 is a flowchart for describing an example of the process according to this embodiment.

When a game stage in which the player plays the musical performance game has been selected from a plurality of game stages, the determination device 1 starts the musical performance game, and reproduces music corresponding to the selected game stage, for example (step S10).

The determination device 1 causes the display 19 to display the instruction mark that instructs the player 20 to move the controller 16 in a predetermined movement pattern (Y in step S12), and determines whether or not output values that respectively have a given relationship with values indicated by the reference data have been output from the acceleration sensor 30 in one of a plurality of predetermined orders during the instruction mark is displayed (step S14). When the determination device 1 has determined that output values that satisfy a given relationship with values indicated by each of a plurality of pieces of reference data have been output from the acceleration sensor 30 in one of the predetermined orders (Y in step S14), the determination device 1 adds points to the score of the player 20 (step S16).

The determination device 1 repeats the process in the steps S12 to S16 until the music ends (N in step S18). When the music has ended, the determination device 1 finishes the musical performance game (Y in step S18).

3. Modification

The invention is not limited to the above embodiments. Various modifications and variations may be made. The configurations of the above embodiments are merely examples. A case of employing a method that achieves effects similar to those of the configurations of the above embodiments is also included within the scope of the invention.

Although the above embodiments have been described taking an example in which the player moves the controller 16 from the movement start position designated in advance, the movement start position may not be designated. In this case, the plurality of orders shown in FIG. 8 are employed as the predetermined order, for example. When the conditions indicated by the reference data A to H have been satisfied in one of the orders shown in FIG. 8, the determination device determines that the player has moved the controller 16 in the movement pattern indicated by the instruction mark 310. As is clear from FIG. 7, when the conditions indicated by the reference data A to H have been satisfied in one of the orders shown in FIG. 8, the player has moved the controller 16 counterclockwise around the z-axis of the controller 16 along a circular moving path in a state in which the gravity G acts in the −y-axis direction of the controller 16.

The above embodiments have been described taking the order (A→B→C→D→E→F→G→H) in which all of the conditions indicated by the reference data A to H are satisfied as an example of the predetermined order. Note that all of the conditions indicated by the reference data A to H need not necessarily satisfied. In this case, the plurality of orders shown in FIG. 9 may be employed as the predetermined order, for example. This makes it possible to adjust the degree of difficulty for the player to move the controller 16 in the movement pattern indicated by the instruction mark 310.

In the above embodiments, the determination device determines whether or not the player has moved the controller 16 in the movement pattern indicated by the instruction mark 310 a predetermined number of times based on the number of times that the output values output from the acceleration sensor 30 have sequentially satisfied the conditions indicated by the reference data A, B, C, D, E, F, G, and H stored in the reference data storage section 174. Note that the determination device may determine whether or not the player has moved the controller 16 in the movement pattern indicated by the instruction mark 310 a predetermined number of times based on the number of pieces of reference data for which the conditions have been satisfied by the output values output from the acceleration sensor 30.

In the above embodiments, the input determination method is described taking a circular moving path (i.e., a movement pattern along two axes (x axis and y axis)) as an example. Note that the input determination method may also be applied to a movement pattern along three axes or a movement along one axis (x axis, y axis, or z axis).

In the above embodiments, the input determination method is described taking a circular moving path (i.e., a movement pattern along two axes (x axis and y axis)) as an example. Note that the input determination method may also be applied to a movement pattern along three axes or a movement along one axis (x axis, y axis, or z axis). For example, when the player moves the controller 16 in the lateral direction (x-axis direction) in a state in which the gravity G acts in the −y-axis direction, the reference data A and E shown in FIG. 13 may be used as the plurality of pieces of reference data. The determination device determines that the player has moved the controller 16 in the lateral direction when the conditions indicated by the reference data A and E are satisfied in the order of A and E or E and A.

The above embodiments have been described taking an example in which the player moves the controller 16 counterclockwise around the z axis. Note that the player may move the controller 16 clockwise around the z axis. In this case, the orders shown in FIG. 15 or 19 may be reversed. For example, the order "A→B→C→D→E→F→G→H" shown in FIG. 15 may be reversed to "H→G→F→E→D→C→B→A". A clockwise movement and a counterclockwise movement may be employed without designating the moving direction of the controller 16.

In the above embodiments, the determination device instructs the player 20 to move the controller 16 in a predetermined movement pattern by displaying the instruction mark on the display 19. Note that the determination device may instruct the player 20 to move the controller 16 in a predetermined movement pattern by outputting instruction sound from the speaker, or increasing the brightness of the display 19 (i.e., displaying a bright image). The determination device may instruct the player 20 to move the controller 16 in a predetermined movement pattern by causing a vibrator provided in the controller 16 to vibrate, or outputting instruction sound from a speaker provided in the controller 16. For example, when the determination device causes a player's character to make a special attack in a fighting game when the player 20 has moved the controller 16 in a predetermined movement pattern, or causes a moving object to be accelerated rapidly in a racing game when the player 20 has moved the controller 16 in a predetermined movement pattern, the determination device may not instruct the player 20 to move the controller 16 in a predetermined movement pattern.

The above embodiments have been described taking an example in which a period in which the instruction mark is displayed on the display 19 is employed as the input reception period. Note that the instruction mark is made bright after displaying the instruction mark, and a period in which the instruction mark is made bright may be employed as the input reception period.

The process of each section (each means) according to the above embodiments may be implemented by only hardware, or may be implemented by a program stored in the information storage medium or a program distributed through a communication interface. Alternatively, the process of each section according to the above embodiments may be implemented by hardware and a program. When implementing the process of each section according to the above embodiments by hardware and a program, a program that causes hardware (computer) to function as each section according to the above embodiments is stored in the information storage medium.

Although the above embodiments have been described taking the musical performance game as an example, the method according to the invention may also be employed for various games such as a fighting game, an action game, a racing game, a sports game, a role-playing game, a shooting game, and a puzzle game.

The invention may be applied to various game systems such as an arcade game system, a consumer game system, a portable game system, a large-scale attraction system in which a number of players participate, a simulator a multimedia terminal, and a portable telephone.

Although only some embodiments of this invention have been described in detail above, those skilled in the art will readily appreciate that many modifications are possible in the embodiments without materially departing from the novel teachings and advantages of this invention. Accordingly, all such modifications are intended to be included within the scope of the invention.

What is claimed is:

1. A non-transitory computer-readable information storage medium storing a program that determines a movement pattern of a controller that includes a sensor for detecting a physical quantity that changes according to a moving direction of the controller, the program causing a computer to function as:
   a storage section that stores (1) a plurality of tuples of reference data that includes a predetermined condition defining the moving direction of the controller, and (2) a plurality of tuples of order data that each indicate a different order of the tuples of reference data;
   an acquisition section that sequentially acquires a plurality of tuples of detected data that indicates the moving direction of the controller obtained from a detection result of the sensor;
   a first determination section that sequentially determines, from among the tuples of reference data, a set of tuples of reference data each tuple of reference data having the predetermined condition which each of the tuples of detected data satisfies; and
   a second determination section that determines, from among the tuples of order data as the movement pattern of the controller, one tuple of order data having an order corresponding to an order the set of tuples of reference data determined by the first determination section.

2. The program as defined in claim 1, the program causing the computer to further function as:
   a counter section that counts the number of pieces of the reference data that has been determined to have the given relationship with the detected data; and
   a processing section that performs a predetermined process based on the number counted by the counter section.

3. The program as defined in claim 1, the program causing the computer to further function as:
   a counter section that counts the number of times that the movement pattern of the controller has been determined; and
   a processing section that performs a predetermined process based on the number counted by the counter section.

4. The program as defined in claim 3,
   wherein the processing section increases benefits to be obtained as the number counted by the counter section increases.

5. The program as defined in claim 3,
   wherein the counter section counts the number of times that the movement pattern of the controller has been determined to be a predetermined movement pattern; and
   wherein the processing section performs the predetermined process on condition that the number counted by the counter section has reached a predetermined number.

6. The program as defined in claim 1,
   wherein the first determination section determines whether or not the plurality of pieces of reference data respectively have the given relationship with the plurality of pieces of detected data acquired within a given period.

7. The program as defined in claim 1, the program causing the computer to further function as:
   a data production section that produces the plurality of pieces of reference data based on the plurality of pieces of detected data.

8. The program as defined in claim 1,
   wherein a processing section causes a display section to display an instruction mark that instructs a player to move the controller in a predetermined movement pattern.

9. The program as defined in claim 8, the program causing the computer to further function as:
   a sound control section that controls reproduction of music, wherein the processing section causes the display section to display the instruction mark in synchronization with reproduction of the music, and causes the display section to display a character that performs a movement according to the movement pattern of the controller indicated by the instruction mark.

10. The program as defined in claim 1,
wherein the physical quantity detected by the sensor is an acceleration vector of the controller; and
wherein the plurality of pieces of reference data indicates an acceleration vector in at least one axial direction.

11. The program as defined in claim 1,
wherein the movement pattern of the controller is a movement pattern that allows the controller to move along a circular moving path; and
wherein the plurality of pieces of reference data indicates the moving direction of the controller in eight directions.

12. A determination device that determines a movement pattern of a controller that includes a sensor for detecting a physical quantity that changes according to a moving direction of the controller, the determination device comprising:
a storage section that stores (1) a plurality of tuples of reference data that includes a predetermined condition defining the moving direction of the controller, and (2) a plurality of tuples of order data that each indicate a different order of the tuples of reference data;
an acquisition section that sequentially acquires a plurality of tuples of detected data that indicates the moving direction of the controller obtained from a detection result of the sensor;
a first determination section that sequentially determines, from among the tuples of reference data, a set of tuples of reference data each tuple of reference data having the predetermined condition which each of the tuples of detected data satisfies; and
a second determination section that determines, from among the tuples of order data as the movement pattern of the controller, one tuple of order data having an order corresponding to an order of the set of tuples of reference data determined by the first determination section.

13. A method of determining a movement pattern of a controller that includes a sensor for detecting a physical quantity that changes according to a moving direction of the controller, the method comprising:
sequentially acquiring a plurality of tuples of detected data that indicates the moving direction of the controller obtained from a detection result of the sensor;
sequentially determining a tuple of reference data of a plurality of tuples of reference data, the plurality of tuples of reference data being stored in a storage section and including a predetermined condition defining the moving direction of the controller, having the predetermined condition which each of the plurality of pieces of detected data satisfy; and
determining a tuple of order data of a plurality of tuples of order data as the movement pattern of the controller, the plurality of tuples of order data being stored in a storage section and each tuple of order data indicating a different order of the tuples of reference data, having an order corresponding to an order of the set of tuples of reference data that have been determined.

* * * * *